(12) United States Patent
Hisashi et al.

(10) Patent No.: US 7,818,921 B2
(45) Date of Patent: Oct. 26, 2010

(54) THROUGH SECTION SHIELDING CONSTRUCTION

(75) Inventors: Kyotani Hisashi, Higashiomi (JP); Izuru Matsubara, Tokyo (JP); Kenji Sakita, Hirakata (JP); Yoshikazu Hayashi, Ibaraki (JP)

(73) Assignee: Daifuku Co., Ltd., Osaka (JP)

( * ) Notice: Subject to any disclaimer, the term of this patent is extended or adjusted under 35 U.S.C. 154(b) by 654 days.

(21) Appl. No.: 11/706,874

(22) Filed: Feb. 15, 2007

(65) Prior Publication Data

US 2007/0212941 A1    Sep. 13, 2007

(30) Foreign Application Priority Data

Feb. 17, 2006  (JP) ............................. 2006-040971
Jan. 18, 2007  (JP) ............................. 2007-009111

(51) Int. Cl.
*E04B 1/346* (2006.01)
*E04B 7/16* (2006.01)

(52) U.S. Cl. ............................. 52/69; 52/71; 198/860.3; 74/608

(58) Field of Classification Search ........................ 52/6, 52/7, 64, 65, 67, 69, 71; 49/69, 73.1, 94, 49/98, 103, 104, 475.1, 484.1; 34/307, 308, 34/311; 118/64, 635; 439/607, 607.23; 198/860.3; 74/608; 427/300

See application file for complete search history.

(56) References Cited

U.S. PATENT DOCUMENTS 2,553,724 A * 5/1951 Ransburg .................... 118/635
7,134,541 B2 * 11/2006 Matsubara et al. ..... 198/468.01

FOREIGN PATENT DOCUMENTS

JP  08024542 A  * 1/1996
JP  2530979     * 1/1997

* cited by examiner

*Primary Examiner*—Richard E Chilcot, Jr.
*Assistant Examiner*—Theodore Adamos
(74) *Attorney, Agent, or Firm*—The Webb Law Firm

(57) ABSTRACT

A through section shielding construction is disclosed in which a partitioning wall defines a slit-like opening extending along a lateral direction as a moving passage of a penetrating member relative to the partitioning wall, and a plurality of shielding plates for closing the slit-like opening are juxtaposed along the slit-like opening as being suspended pivotally to be pushed open one after another by the penetrating member moving along the slit-like opening. The shielding plates are provided as adjacent pairs, and there is provided an operative coupling mechanism for operably coupling, with each other, two shielding plates constituting each pair in such a manner that in association with one of the paired shielding plates being pushed open in one direction by the penetrating member, the other shielding plate is pivotally opened in the opposite direction to the one direction.

14 Claims, 20 Drawing Sheets

FIG.4
(a)
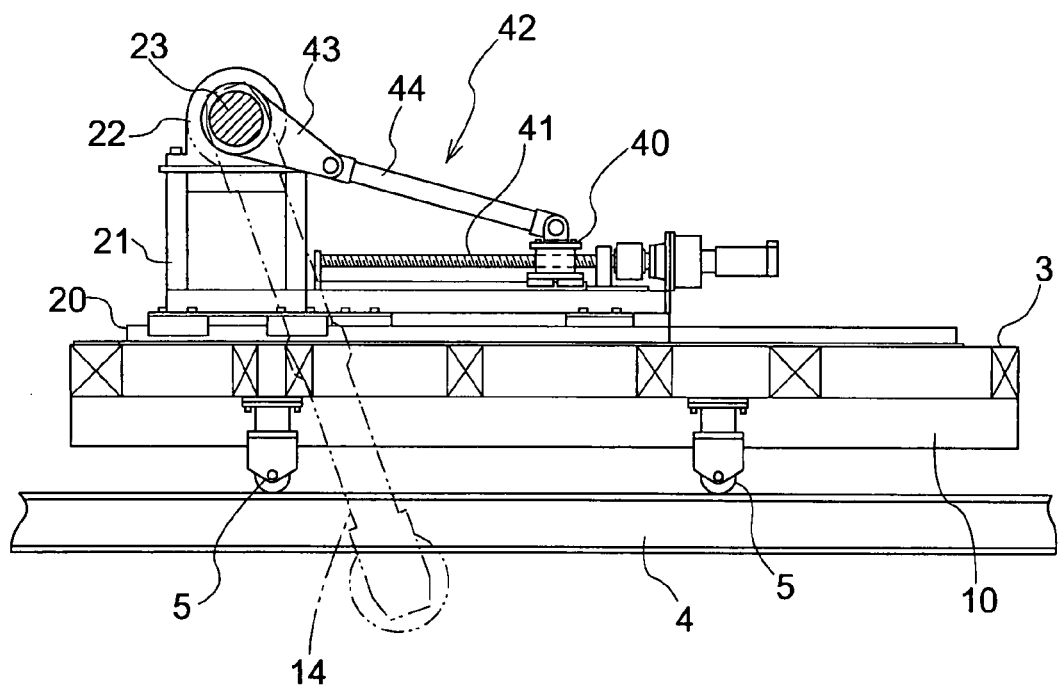
(b)
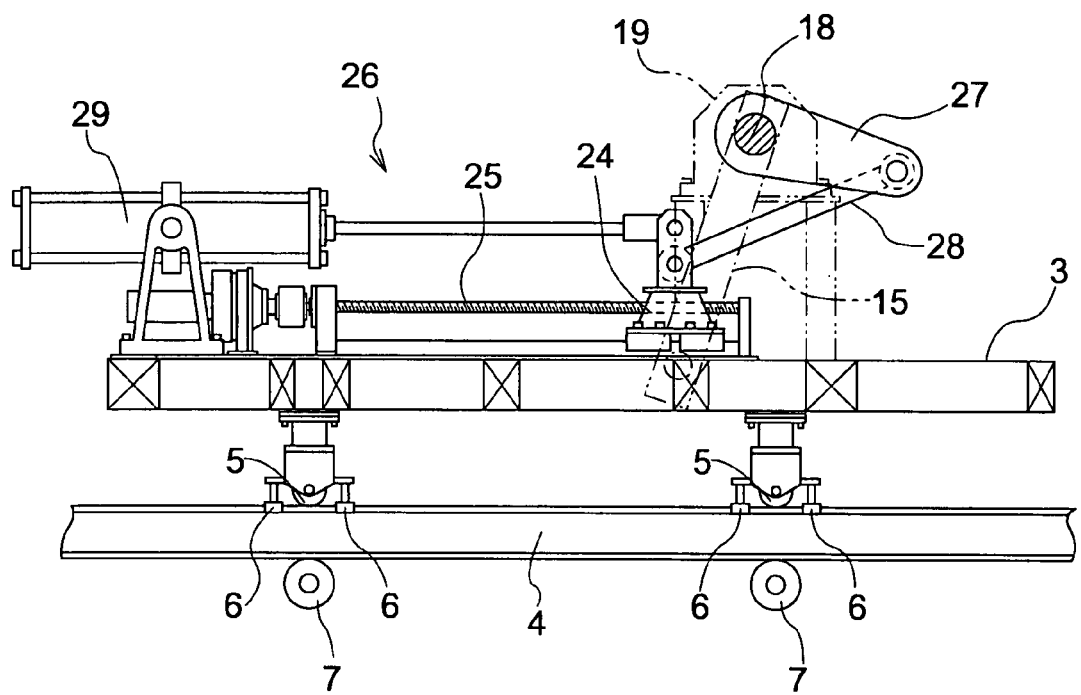

FIG.16
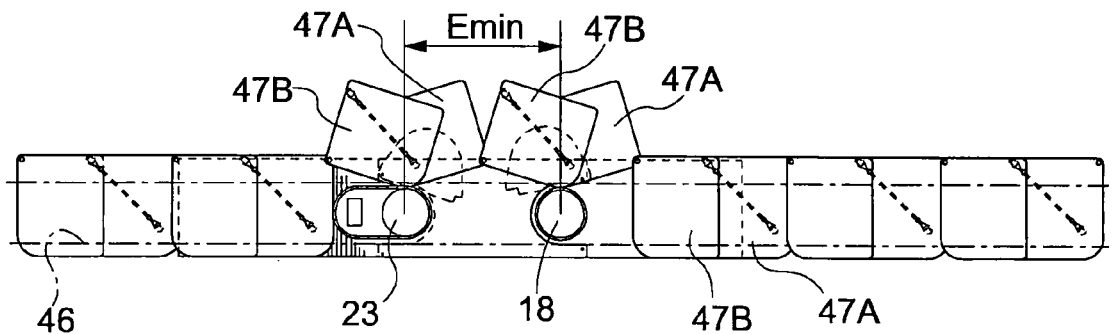
(a)
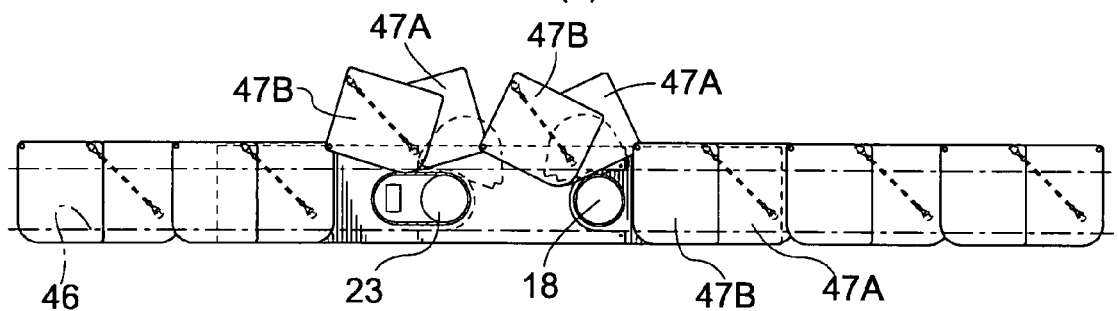
(b)
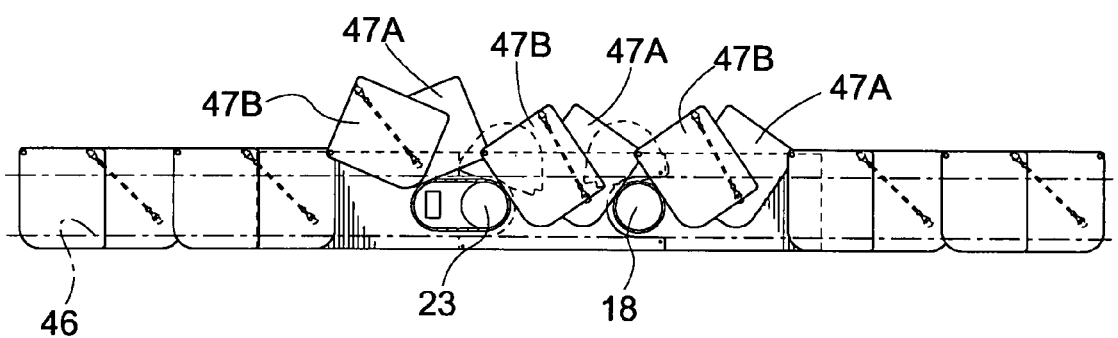
(c)
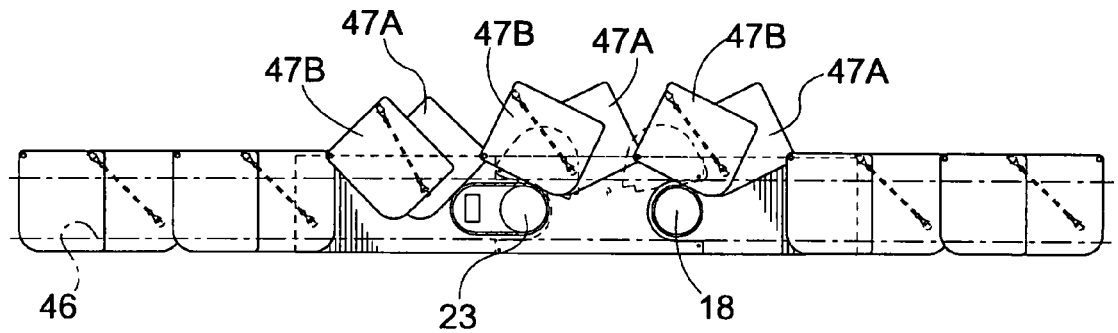
(d)

FIG.17
(a)
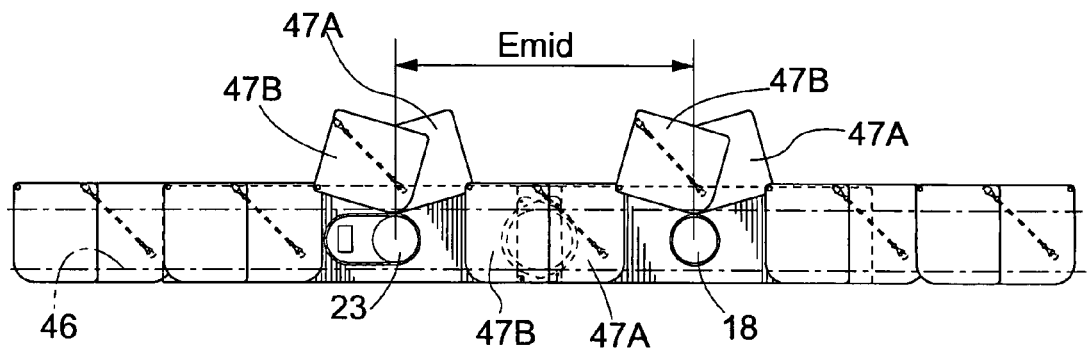
(b)
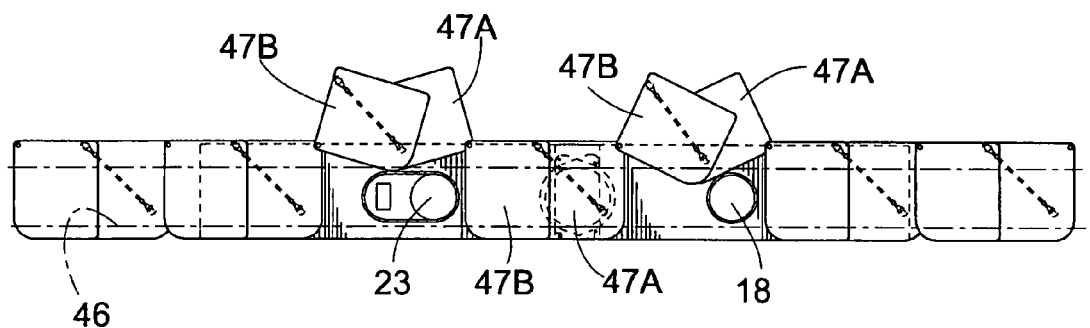
(c)
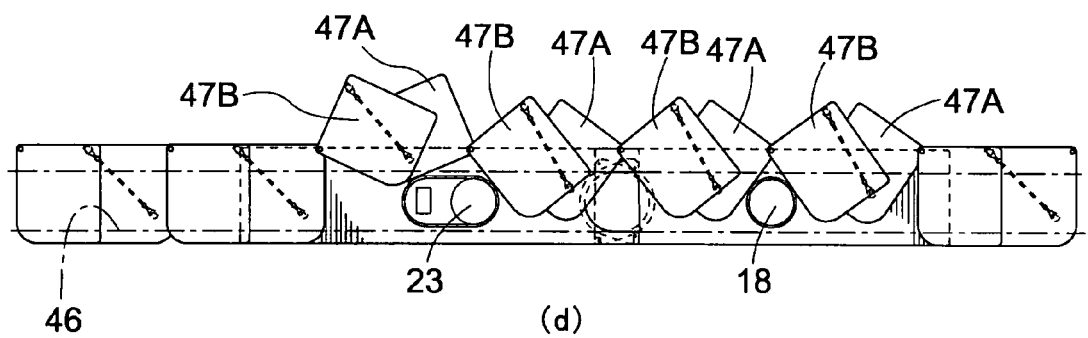
(d)
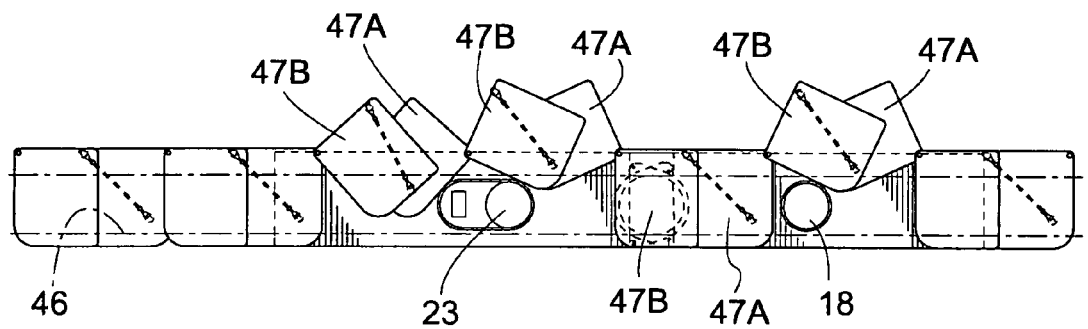

FIG.19
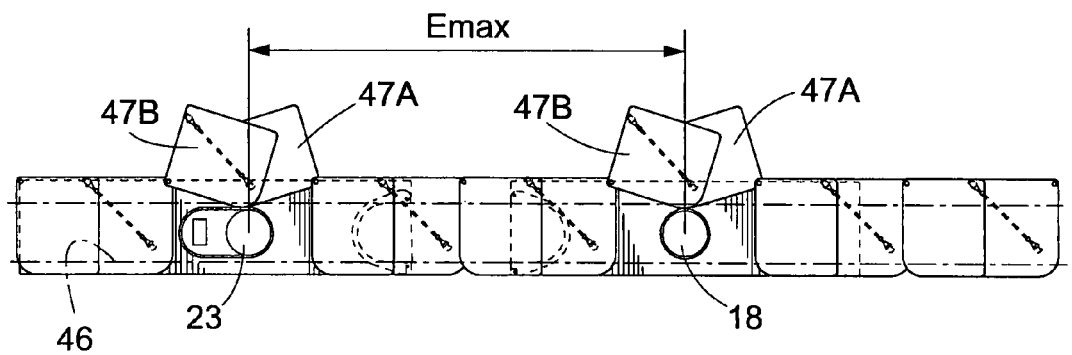
(a)
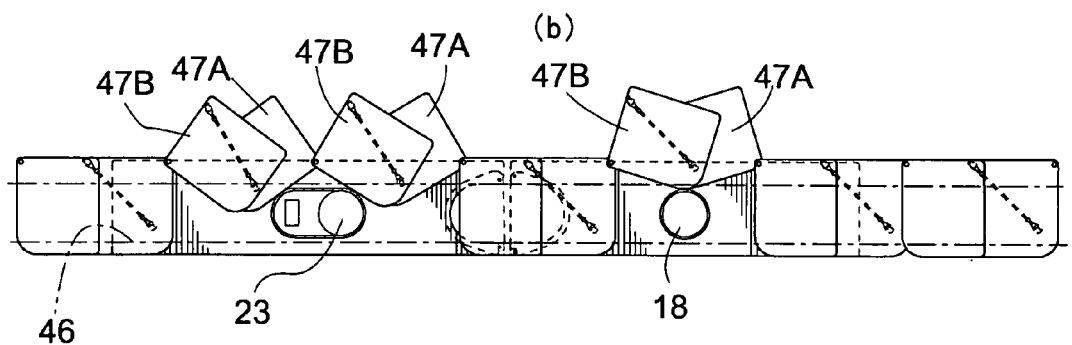
(b)
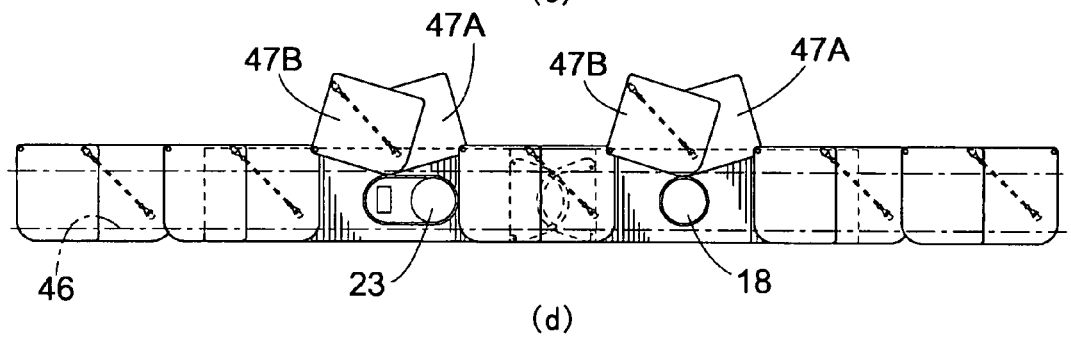
(c)
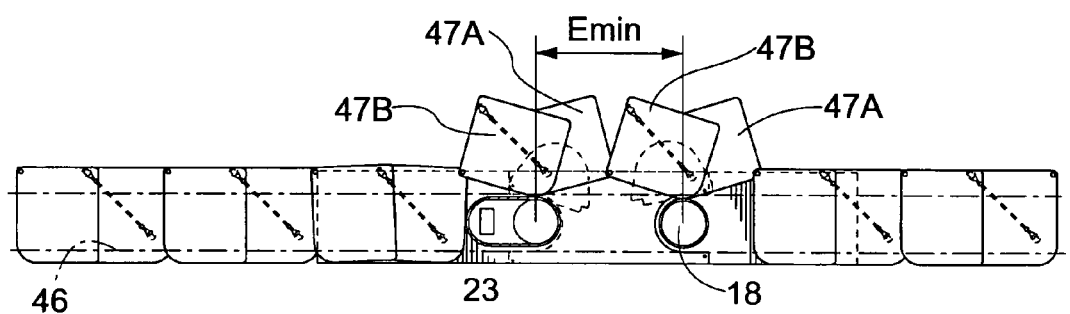
(d)

THROUGH SECTION SHIELDING CONSTRUCTION

CROSS-REFERENCE OF RELATED APPLICATIONS

This application claims priorities based on the Japanese patent application JP 2006-40971 and the Japanese patent application JP 2007-9111 both assigned to this applicant and filed on Feb. 17, 2006 and Jan. 18, 2007, respectively, the entire disclosures thereof being incorporated as reference herein.

BACKGROUND OF THE INVENTION

1. Field of the Invention

The present invention relates to a through section shielding construction in which in order to prevent intrusion of a foreign object into a partitioned area partitioned by a partitioning wall penetrating a slit-like opening provided as a penetrating member moving passage, a penetrating-member absence portion of the slit-like opening is kept closed with a shielding plate which can be pivotally opened/closed for allowing movement of a penetrating member.

More particularly, the invention relates to such through section shielding construction wherein the partitioning wall defines the slit-like opening extending along a lateral direction as the moving passage of the penetrating member relative to the partitioning wall, and a plurality of shielding plates for closing the slit-like opening are juxtaposed along the slit-like opening as being suspended pivotally to be pushed open one after another by the penetrating member moving along the slit-like opening.

2. Background Art

The through section shielding construction of the above-noted type is used in e.g. a painting installation wherein an object to be painted by being submerged in a paint tank is carried in association with a movement of a penetrating member, while the object is being supported by this penetrating member. This construction can obtain higher durability when using shielding plates, compared with a construction in which the slit-like opening is closed in a curtain-like manner, with a soft material. Conventionally, with this type of through section shielding construction, the respective shielding plates juxtaposed along the slit-like opening are suspended to be pivotable independently of each other.

However, with the above-described conventional construction using the shielding plates suspended to be pivotable independently of each other, when the moving penetrating member pushes open the shielding plate and passes through the disposing position of this shielding plate, in succession, when the penetrating member has moved away from the shielding plate, the shielding plate which has been pivotally opened upwards will be allowed to fall freely to its closing suspended state, in the course of which a large noise such as a friction noise or collision noise will be generated. And, during the continued movement of the penetrating member, such free fall of the shielding plate occurs for the plurality of shielding plates one after another, thus causing a significant noise.

SUMMARY OF THE INVENTION

In view of the above-described state of the art, a primary object of the present invention is to effectively solve the above-described problem penetrating rational improvement.

[1] According to a first characterizing feature of the present invention, there is provided a through section shielding construction in which a partitioning wall defines a slit-like opening extending along a lateral direction as a moving passage of a penetrating member relative to the partitioning wall, and a plurality of shielding plates for closing the slit-like opening are juxtaposed along the slit-like opening as being suspended pivotally to be pushed open one after another by the penetrating member moving along the slit-like opening;

wherein the shielding plates are provided as adjacent pairs, and there is provided an operative coupling mechanism for operably coupling, with each other, two shielding plates constituting said each pair in such a manner that in association with one of the paired shielding plates being pushed open in one direction by the penetrating member, the other shielding plate is pivotally opened in the opposite direction to said one direction.

With the above-described first characterizing feature, for each paired two shielding plates, as the moving penetrating member pushes open one of these shielding plates (i.e. the shielding plate on the upstream side in the moving direction), in operative association therewith, the other shielding plate disposed on the downstream side in the moving direction is pivotally opened in the opposite direction (i.e. to the upstream side in the moving direction) to the opening direction of the one shielding plate. Therefore, after the penetrating member has passed the disposing position of one shielding plate, in succession therewith, this penetrating member will enter the disposing position of the other shielding plate which has already assumed the state of being pivotally opened in the opposite direction, hence, the penetrating member will retain this other shielding plate at its oppositely pivotally opened state penetrating its contact therewith.

Therefore, even after the penetrating member has completely left one shielding plate, as long as this penetrating member retains the other shielding plate under its oppositely pivotally opened state, the pivotally opened state of the one shielding plate is maintained just like a case when the penetrating member moving in reverse pushes open the other shielding plate first and the one shielding member is pivotally opened in the opposite direction in association therewith.

With continued movement of the penetrating member from the above-described condition, the other shielding plate will be allowed to descend in the controlled progressive manner to its closing suspended state, while being kept in contact with the penetrating member. Then, after the other shielding plate has reached the closing suspended state, the penetrating member will then move away from this other shielding plate. In the course of this descending process, in its operative coupling with the other shielding plate, the one shielding plate too will be caused to descend in a controlled and progressive manner from its pivotally opened state to reach its closing suspended state eventually.

That is to say, with the above-described first characterizing feature, for each paired shielding plates, both the one shielding plate located on the upstream side in the moving direction of the penetrating member and the other shielding plate located on the downstream side of the same can be allowed to descend with its own weight in the controlled progressive manner to the respective closing suspended states, in association with the movement of the penetrating member. As a result, it has become possible to effectively prevent generation of large noise such as friction noise or collision noise which would occur in the above-described conventional construction due to the uncontrolled free fall of each shielding plate.

Moreover, with the first characterizing feature of the invention, the above-described advantageous function can be obtained also in a case when the penetrating member moving in reverse pushes open first the other shielding plate (i.e. the shielding plate located on the upstream side in this reverse moving direction) and then the penetrating member passes through the disposing position of the one shielding plate (i.e. the shielding plate located on the downstream side in this reverse moving direction). Hence, the inventive construction can cope with both of the movement of the penetrating member in the forward direction and that in the reverse direction. In this respect, the through section shielding construction of the invention is superior also in terms of function and utility in the use of the penetrating member.

Incidentally, with the first characterizing feature, it is possible to cope with both the forward movement of the penetrating member and the reverse movement of thereof as described above. Yet, it should be obvious for one skilled in the art to implement the first characterizing feature construction in the case of the penetrating member being movable only in one direction.

[2] According to a second characterizing feature of the present invention, which specifies a preferred mode of embodying the first characterizing feature construction, said operative coupling mechanism includes first and second links disposed between pivot axes of the paired shielding plates as viewed from an aperture plane of said slit-like opening, with a lower end of the first link being pivotally connected to one shielding plate, a lower end of the second link being pivotally connected to the other shielding plate, upper ends of the first and second links being pivotally connected to each other at an upper end pivot connection point and a guiding means for guiding vertical displacement of said upper end pivot connection point over a predetermined range.

That is, with this second characterizing feature, as the moving penetrating member pushes open one shielding plate by pivoting it about its pivot axis, the first link whose lower end is pivotally connected to this one shielding plate is pushed upward, whereby the upper end pivot connection point between the first link and the second link is displaced upward under the guidance of the guiding means.

Then, as this upward displacement of the upper end pivot connection point pushes up the second link, the other shielding plate to which the lower end of the second link is connected is pivotally opened about its pivot axis in association with the one shielding plate and in the direction opposite thereto.

That is, with this second characterizing feature, for realizing the mutually operative association between the two shielding plates paired in such a manner that as one shielding plate is pushed open in a direction, the other shielding plate is pivotally opened in the opposite direction, there is employed the extremely common and simple mechanism consisting essentially of the first and second links and the guiding means for guiding the upper end pivot connection point of these links, in order to provide the operably coupled movements of the two shielding plates. As a result, it has become possible to simplify the manufacture of the construction and reduce its costs.

[3] According to a third characterizing feature of the present invention, which specifies a preferred mode of embodying the first characterizing feature construction, said operative coupling mechanism includes a coupling link having one end thereof pivotally connected to one shielding plate and having the other end thereof pivotally connected to the other shielding plate, with a pivot connection of said coupling link to the other shielding plate being disposed above a virtual straight line interconnecting a pivot connection of said coupling link to the one shielding plate and the pivot axis of the other shielding plate, as viewed from an aperture plane of said slit-like opening, the pivot connection of said coupling link to the one shielding plate being disposed below a virtual line interconnecting the pivot connection of the coupling link to the one shielding plate and the pivot axis of the one shielding plate, as viewed from the aperture plane of said slit-like opening, and a stopper means for limiting the gravity descension of each one of the paired shielding plates to a predetermined closing suspended position.

Namely, with this third characterizing feature, as the moving penetrating member pushes open one shielding plate by pivoting it about its pivot axis, in the direct operative coupling between the two shielding plates provided by the coupling link, the other shielding plate will be pivotally opened about its pivot axis in the opposite direction to the opening direction of the one shielding plate, in association with the pivotal movement of the one shielding plate.

That is, with this third characterizing feature, for realizing the mutually operative association between the two shielding plates paired in such a manner that as one shielding plate is pushed open in a direction, the other shielding plate is pivotally opened in the opposite direction, there is employed the extremely common and simple mechanism consisting essentially of the coupling link for directly coupling these two shielding plates with each other and the stopper means for limiting the gravity descension of each one of the paired shielding plates to a predetermined closing suspended position. As a result, compared even with the second characterizing construction described above, it has become possible to further simplify the manufacture of the construction and further reduce its costs.

Incidentally, in implementation of the third characterizing feature construction, if the penetrating member is moved in one direction only, the upstream/downstream relationship between one shielding plate and the other shielding plate in the moving direction of the penetrating member can be a construction of one shielding plate being disposed on either the upstream side or the downstream side.

[4] According to a fourth characterizing feature of the present invention, which specifies a preferred mode of embodying the first characterizing feature construction, the construction further comprises a movable shielding plate attached to said penetrating member, the movable shielding plate shielding a portion of the slit-like opening where the shielding plate is opened by the penetrating member.

That is, with this fourth characterizing feature construction, when the penetrating member passes through the disposing positions of the two shielding plates provided as a pair, both of these two shielding plates are maintained under the pivotally opened states. Whereas, as the movable shielding plate is moved together with the penetrating member, this movable shielding plate can close the portion of the slit-like opening corresponding to the two shielding plates which are retained under the pivotally opened states (i.e. the portion of the opening where the shielding plates are opened by the penetrating member). With this, the slit-like opening can be closed maximally, for enhanced shielding effect. As a result, intrusion of foreign substance through the slit-like opening can be prevented even more effectively and reliably.

[5] According to a fifth characterizing feature of the present invention, which specifies a preferred mode of embodying the fourth characterizing feature construction described above, said penetrating member includes first and second penetrating members having a spacing in the moving direction thereof variable, said movable shielding plate being attached to each one of the first penetrating member and the second penetrating member such that the movable shielding plate attached to the first penetrating member and the movable shielding plate attached to the second penetrating member are partially overlapped with each other when the spacing between the first penetrating member and the second penetrating member is reduced;

one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and an auxiliary shielding plate for closing said cutaway portion is suspended to be pivotally pushed open by the counterpart approaching penetrating member.

Namely, with this fifth characterizing feature construction, the first and second penetrating members are provided as the penetrating member. And, basically, the movable shielding plate is attached to each one of these first and second shielding plates in the manner described above, whereby the shielding performance for shielding the slit-like opening is enhanced. In this case, if the length dimension of each movable shielding plate is increased, this will ensure such high shielding effect for each movable shielding plate for each one of the first and second penetrating members. Yet, for the required variation in the spacing between the first penetrating member and the second penetrating member, the increased length dimension will disadvantageously impose a limit on the range of minimal spacing possible, due to possible interference between the movable shielding plate attached to the first penetrating member and the second penetrating member and/or possible interference between the movable shielding plate attached to the second penetrating member and the first penetrating member.

On the other hand, according to the fifth characterizing feature construction described above, when the spacing between the first penetrating member and the second penetrating member is reduced, one end of the movable shielding plate of the first penetrating member on the side of the second penetrating member defines a cutaway portion for receiving therein the second penetrating member which approaches the movable shielding plate of the first penetrating member. Similarly, one end of the movable shielding plate of the second penetrating member on the side of the first penetrating member defines a cutaway portion for receiving therein the first penetrating member which approaches the movable shielding plate of the second penetrating member. With this arrangement, it becomes possible to minimize the variable spacing to be provided between the first penetrating member and the second penetrating member, while ensuring increased length dimension of the movable shielding plate to be attached to each one of the first and second penetrating members along their moving direction.

Further, at the end of the movable shielding plate attached to each one of the first and second penetrating members, in addition to the cutaway portion, there is also provided an auxiliary shielding plate for closing this cutaway portion, the auxiliary shielding plate being pivotally pushed open by the counterpart penetrating member approaching it. Accordingly, in response to the pushed opening, entrance of the counterpart penetrating member into each cutaway portion is allowed. At the same time, when the spacing between the first penetrating member and the second penetrating member is large so that there is no intrusion of the counterpart penetrating member into the cutaway portion, the cutaway portions are effectively closed by the auxiliary shielding plates under the closing suspended states thereof. As a result, the movable shielding plate of each one of the first and second penetrating members can provide sufficient shielding effect to the slit-like opening along its entire length in the moving direction.

That is to say, with the fifth characterizing feature, it becomes possible to achieve, at one time, both the desirable object of ensuring improved functionality and utility in the use of the first and second penetrating members through minimization of the spacing between the first and second penetrating members and the equally desirable object of ensuring higher shielding effect for the slit-like opening by the movable shielding plate attached to each one of the first and second shielding plates.

[6] A sixth characterizing feature of the present invention specifies a preferred mode of embodying the second characterizing feature construction and the contents of this sixth characterizing feature are same as the fourth characterizing feature construction described in [4] above.

[7] A seventh characterizing feature of the present invention specifies a preferred mode of embodying the sixth characterizing feature construction and the contents of this seventh characterizing feature are same as the fifth characterizing feature construction described in [5] above.

[8] An eighth characterizing feature of the present invention specifies a preferred mode of embodying the third characterizing feature construction and the contents of this eighth characterizing feature are same as the fourth characterizing feature construction described in [4] above.

[9] A ninth characterizing feature of the present invention specifies a preferred mode of embodying the eighth characterizing feature construction and the contents of this ninth characterizing feature are same as the fifth characterizing feature construction described in [5] above.

BRIEF DESCRIPTION OF THE DRAWINGS

FIG. 4 is an enlarged side view showing principal portions of the carrying treating apparatus, FIG. 16 is a plate face view illustrating moving relationship among first and second support shafts and the shielding plates, relating to the second embodiment, FIG. 17 is a plate face view illustrating moving relationship among first and second support shafts and the shielding plates, relating to the second embodiment, FIG. 19 is a plate face view illustrating moving relationship among first and second support shafts and the shielding plates, relating to the second embodiment.

DESCRIPTION OF PREFERRED EMBODIMENTS

First Embodiment

Figure 1:
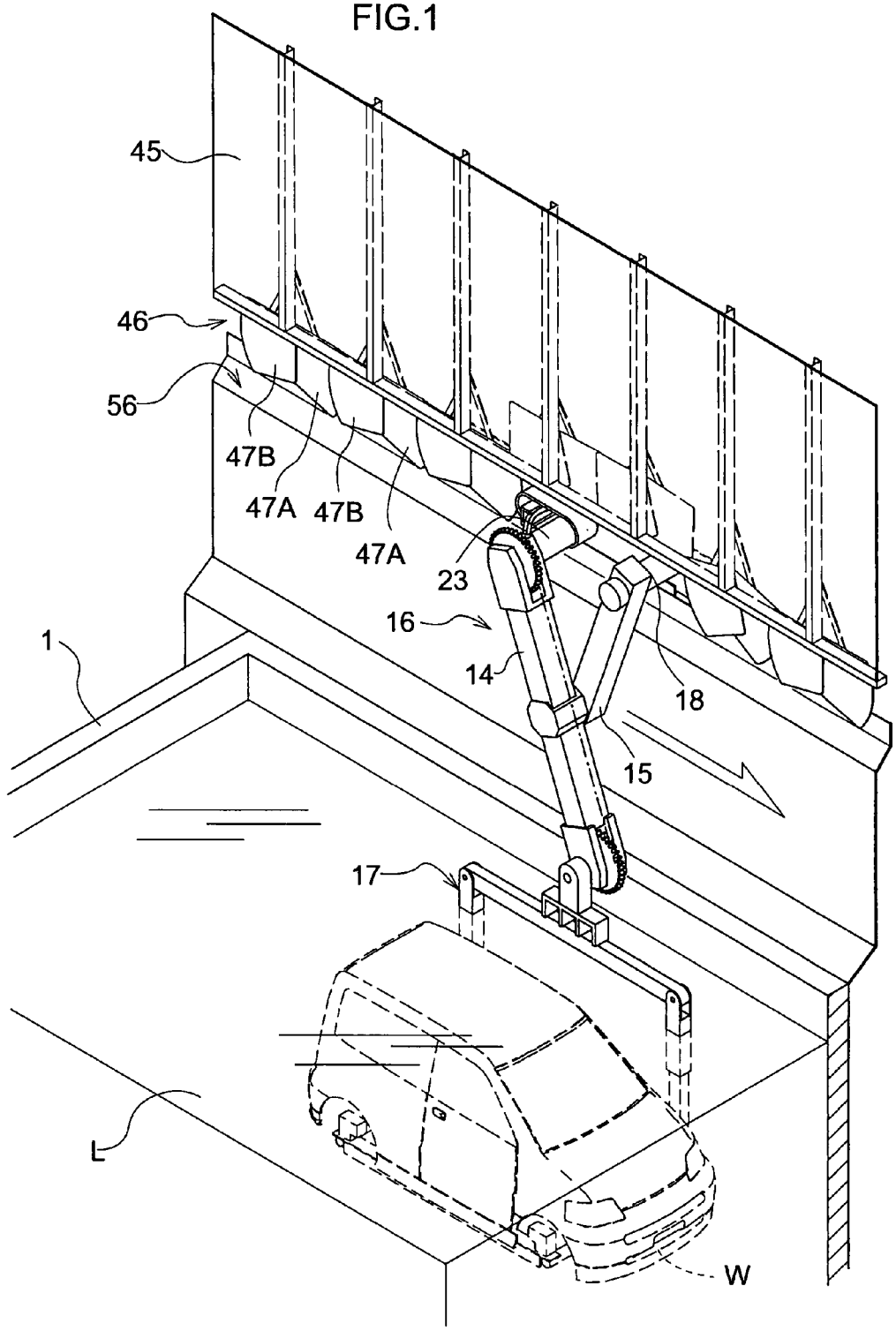
FIG. 1 is a perspective view showing a carrying treating apparatus.
Figure 2:
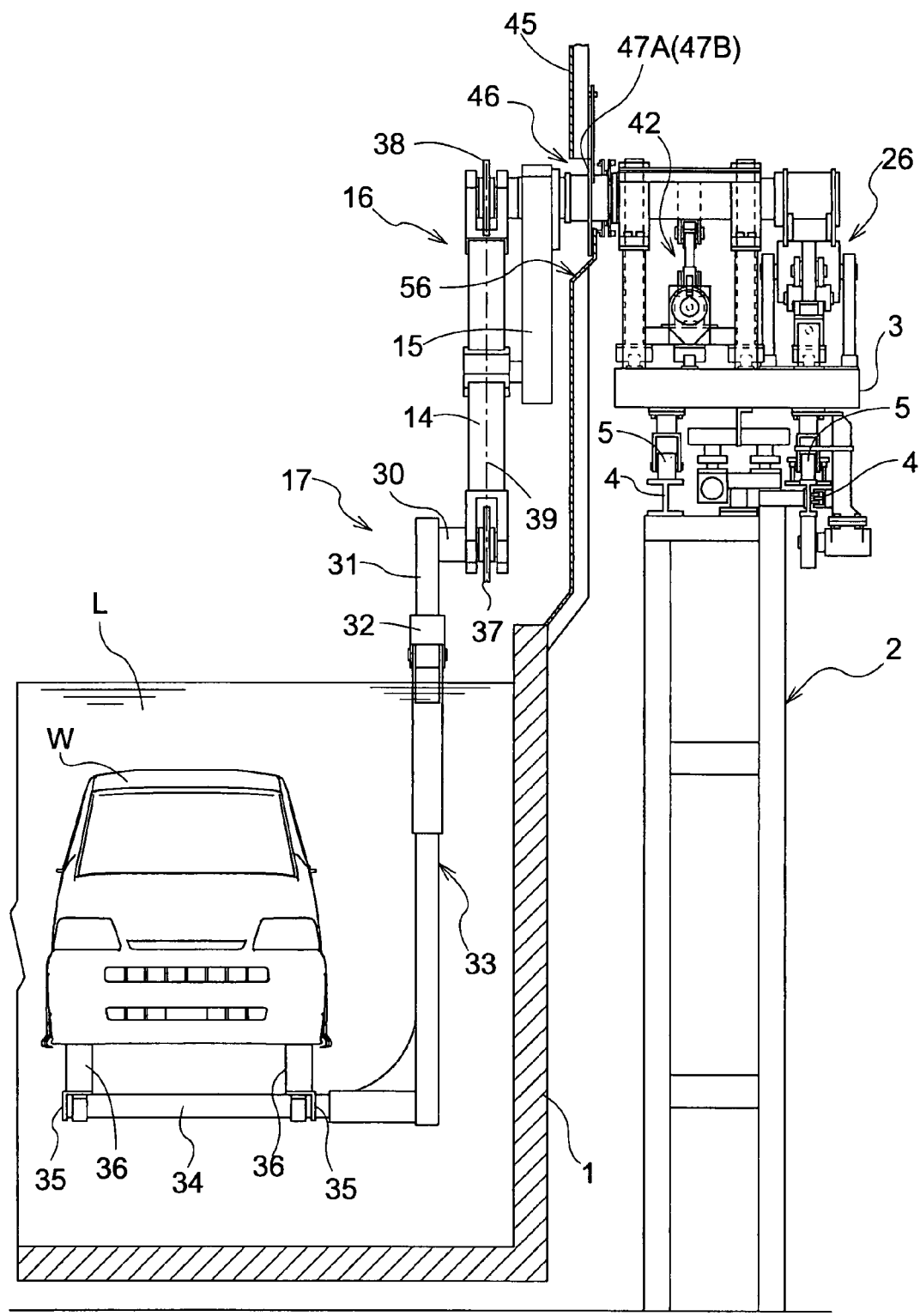
FIG. 2 is a front view showing the carrying treating apparatus.

FIGS. 1 and 2 shows a carrying treating apparatus operable to carry an automobile body W and effect on this carried body W such treatment as a pretreatment exemplified by a degreasing treatment by dipping the body W in a treating liquid L held in a liquid tank 1 or an electroplating treatment subsequent thereto. A guide structure 2 is provided on one lateral side of the liquid tank 1 and on this guide structure 2, there is laid a pair of traveling rails 4 along which a carrier cart 3 is caused to travel.

Figure 3:
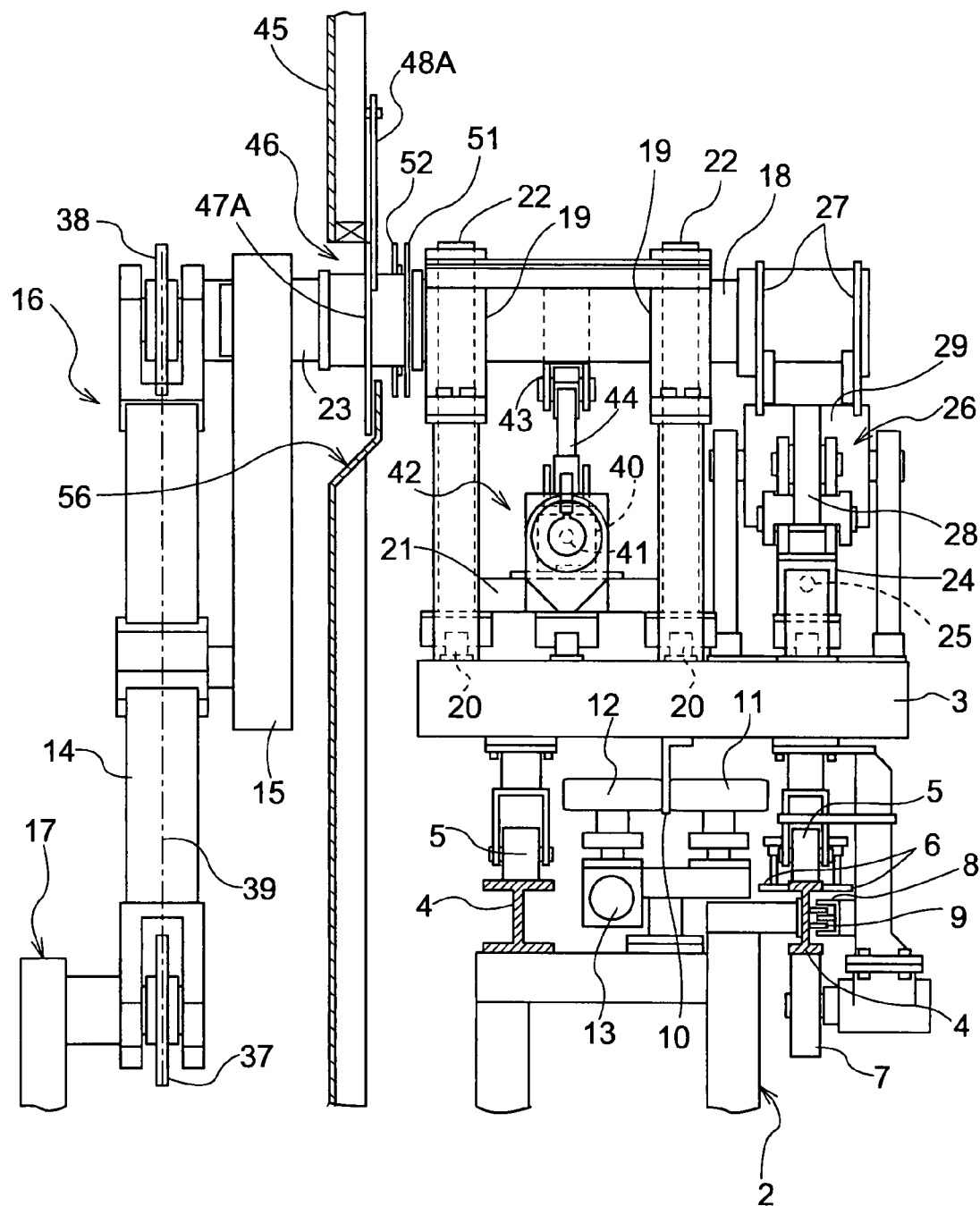
FIG. 3 is an enlarged front view showing principal portions of the carrying treating apparatus.

As shown in FIGS. 2 and 3, the carrier cart 3 includes traveling wheels 5 for rolling on the traveling rails 4, an anti-rocking wheel 6 contacting the traveling rail 4 from the opposed sides thereof for preventing rocking displacement of the carrier cart 3, and an anti-floating wheel 7 contacting the lower face of the traveling rail 4 for preventing floating displacement of the carrier cart 3. Further, there is provided a collector 9 for collecting electric power for driving the carrying treating apparatus from a feeder rail 8 laid along one lateral face of one traveling rail 4.

Further, a traveling friction plate 10 is attached to the bottom of the carrier cart 3. Along the traveling path for the carrier cart 3, a plurality of pairs of free rollers 11 and drive rollers 12 for sandwiching the traveling friction plate 10 therebetween are disposed with a predetermined interval. In operation, as the friction plate 10 sandwiched between these free rollers 11 and the drive rollers 12 is driven by rotational drive of the drive rollers 12 by a motor 13, the carrier cart 3 is driven to travel.

The carrier cart 3 mounts a lift device 16 having a lift arm 14 and a drive arm 15. To the leading end of the lift arm 14, there is attached a suspending mechanism 17 for suspending an automobile body W to be treated.

Referring to the construction of the lift device 16, as shown in FIGS. 3 through 6, a first support shaft 18 to which a base end of the drive arm 15 is fixedly connected is rotatably supported by a fixed shaft 19 mounted on the carrier cart 3. On the other hand, the carrier cart 3 mounts thereon a movable rack 21 movable in a forward/rearward direction (moving direction of the carrier cart 3) guided by guide rails 20. Moving bearings 22 mounted on the movable rack 21 rotatably support a second support shaft 23. To this second support shaft 23, a base end of the lift arm 14 is rotatably supported and the leading end of the drive arm 15 is pivotally connected to the center portion of the lift arm 14.

The carrier cart 3 further mounts a lift drive unit 26 for moving a non-rotatable slider 24 back and forth with rotational drive of a threaded shaft 25. And, the slider 24 of this lift drive unit 26 and an operational arm 27 fixedly connected to the first support shaft 18 are operably coupled to each other via a connecting rod 28.

Figure 5:
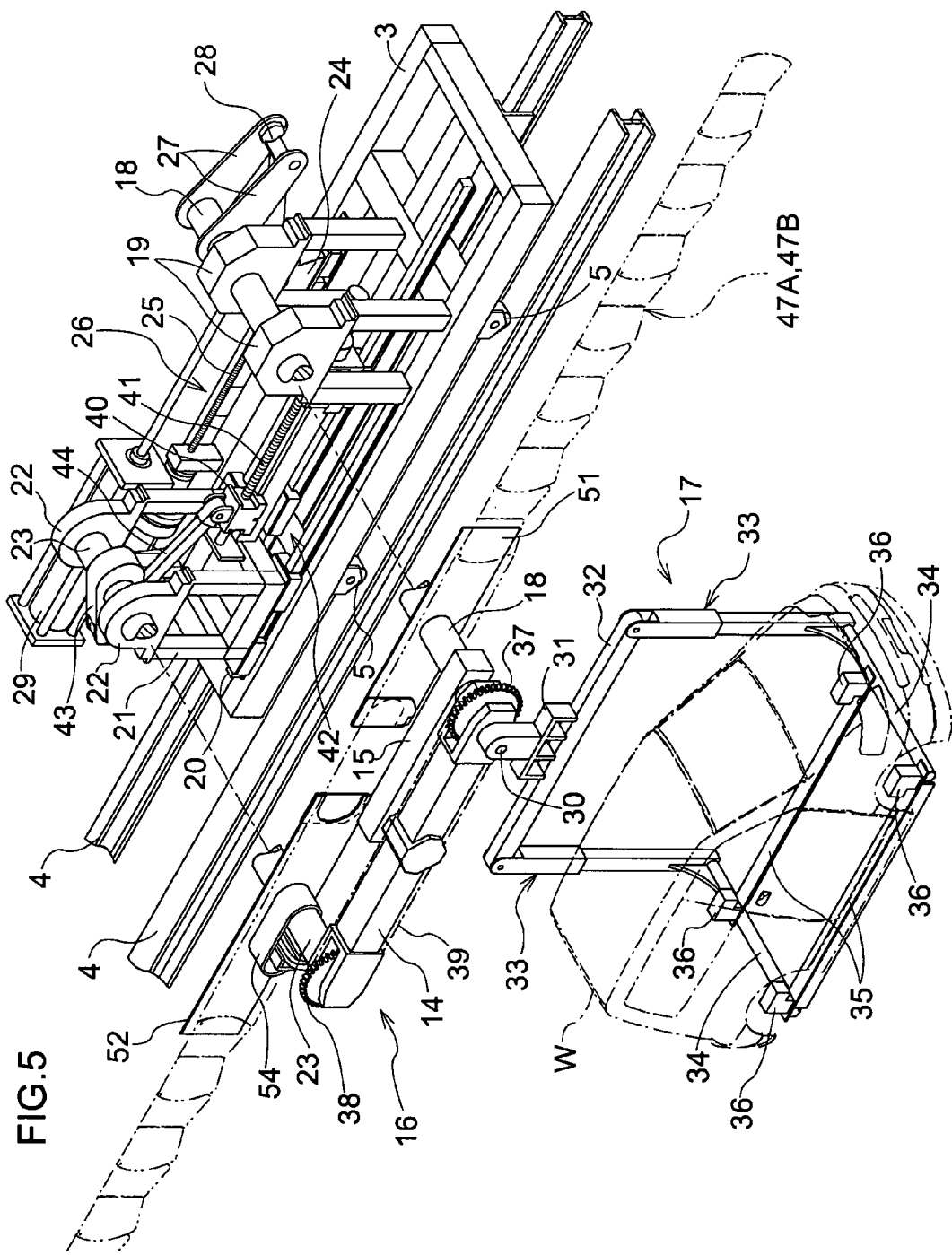
FIG. 5 is a perspective view illustrating a mode of lifting operation.
Figure 6:
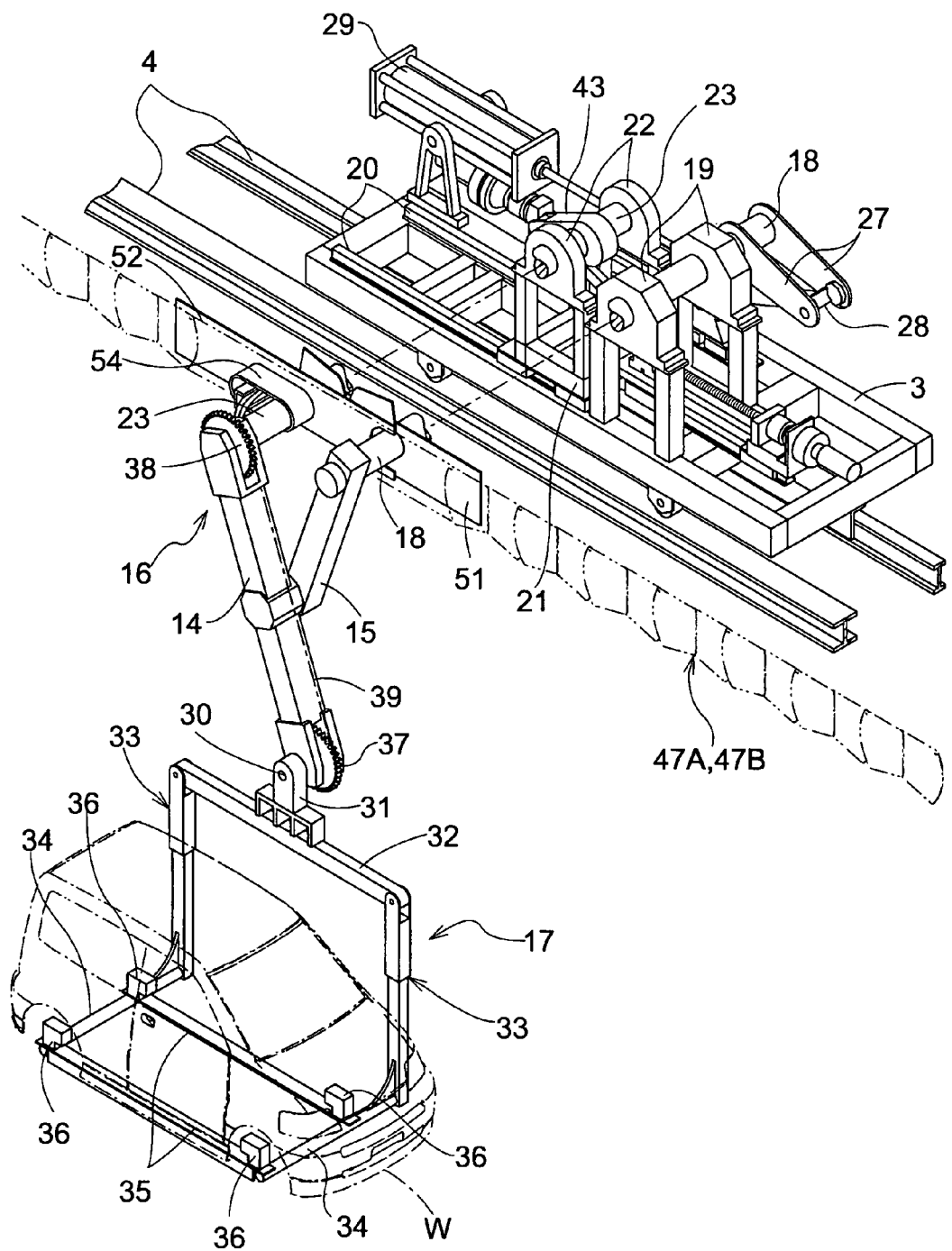
FIG. 6 is a perspective view illustrating a mode of lifting operation.

That is to say, with this lift device 16 in operation, in response to the drive rotation of the threaded shaft 25, the slider 24 of the lift drive unit 26 is moved back and forth, thus pivoting an the operational arm 27 of the first support shaft 18 via the connecting rod 28, whereby the first support shaft 18 is rotated to pivotally drive the drive arm 15. In response to this pivotal movement of the drive arm 15, the lift arm 14 is pivoted about the second support shaft 23, as being accompanied by the back and forth movements of the movable rack 21, the moving bearings 22 and the second support shaft 23 (in other words, movements of the second support shaft 23 closer to and away from the first support shaft 18), whereby the automobile body W retained by the suspending mechanism 17 is lifted up/down as illustrated in FIGS. 5 and 6.

Numeral 29 denotes a pneumatic cylinder for urging the operational arm 27 of the first support shaft 18 toward the lift-up side of the automobile body W via the connecting rod 28. This urging force serves to relieve the load to be applied to the lift drive unit 26.

Referring next to the suspending mechanism 17, a suspension support shaft 30 is rotatably attached to the leading end of the lift arm 14 and a suspension member 31 connected to this suspension support shaft 30 is connected to a longitudinal center portion of an upper frame 32. To fore and aft opposed ends of the upper frame 32, upper ends of vertical frames 33 are pivotally connected. From the lower end of each vertical frame 33, a lateral frame 34 extends to the opposite side to the carrier cart 3. Further, to these fore and aft lateral frames 34, fore and aft ends of two lower frames 35 are rotatably connected. With this construction in operation, the automobile body W is placed on the frame consisting of the lateral frames 34 and the lower frames 35 and under this condition, the automobile body W is retained by means of retainers 36 provided at the four corners of the frame.

Further, the upper frame 32, the fore and aft vertical frames 33 and the lower frames 35 together constitute a parallelogram link mechanism. On the other hand, a transmission chain 39 is entrained about a driven sprocket 37 attached to the suspension support shaft 30 and a drive sprocket 38 attached to the second support shaft 23. The carrier cart 3 also mounts a posture changing drive unit 42 for moving, back and forth, a non-rotatable slider 40 by rotational drive of a threaded shaft 41. And, the slider 40 of this posture changing drive unit 42 and an operational arm 43 fixedly connected to the second support shaft 23 are operably coupled to each other via a connecting rod 44.

Figure 7:
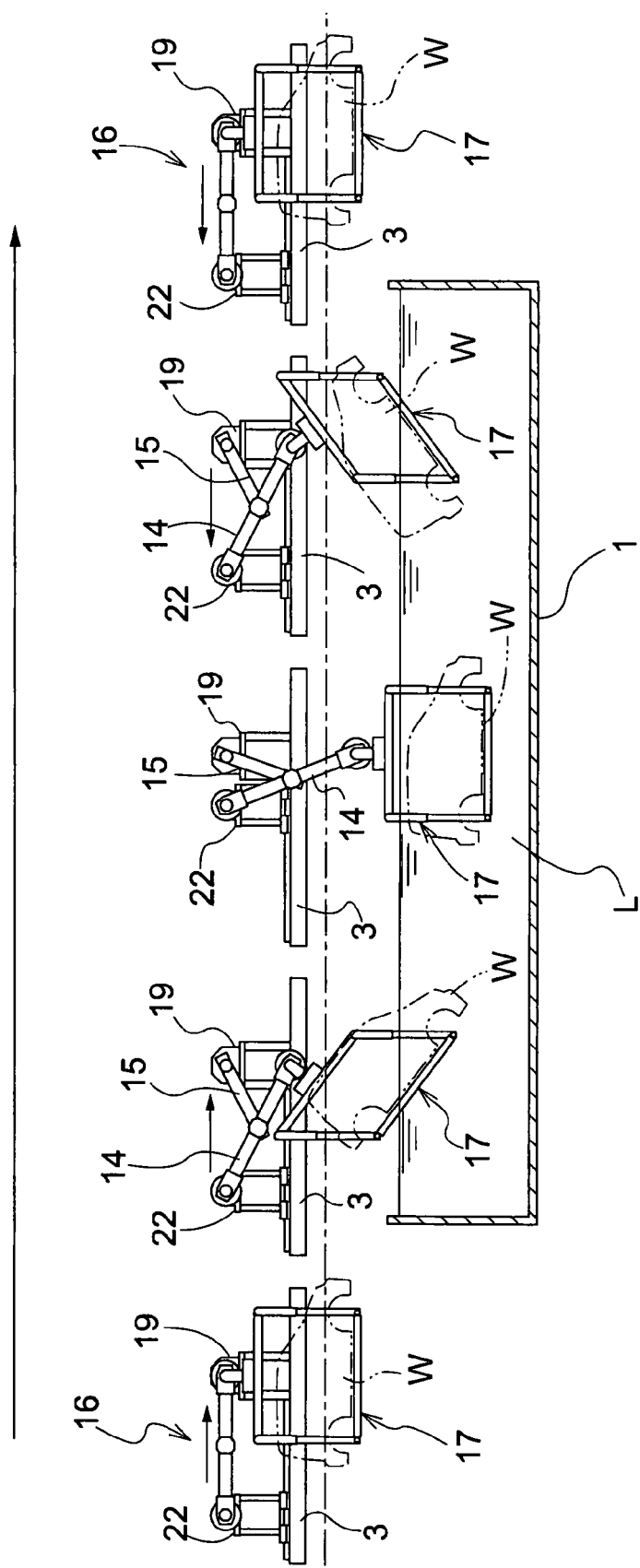
FIG. 7 is a side view explaining a process of carrying treating operation, FIG. 8 are a section view and a view showing shielding plates both taken along the faces of the plates.

That is to say, as the threaded shaft 41 is rotatably driven, the slider 40 of the posture changing drive unit 42 is moved in the fore and aft direction, thereby pivoting the operational arm 43 of the second support shaft 23 via the connecting rod 44. With this, the second support shaft 23 is rotated to rotatably drive the drive sprocket 38. In response to this rotation of the drive sprocket 38, via the transmission chain 39, the drive sprocket 37 and also the suspension support shaft 30 are rotated to pivot the suspension member 31. Hence, as illustrated in FIG. 7, there occurs deformation in the parallelogram link mechanism consisting of the upper frame 32, the fore and aft vertical frames 33 and the lower frames 35, so that the postures of the upper frame 32 and the lower frames 35 are changed accordingly. With this, the posture the automobile body W retained by the retainers 36 is changed from a front-lowered inclined posture to a rear-lowered inclined posture via a horizontal posture.

And, in association with the carrying of the automobile body W by traveling of the carrier cart 3, the above-described lifting operations and the posture changing operation will be effected in appropriate combination. More particularly, as illustrated in FIG. 7, with progress of the carrying operation of the automobile body W, the automobile body W which has been carried under the horizontal posture, will be first lowered and also changed in its posture into the front-lowered liquid entrance posture, so that the body W will be introduced into treating liquid L held in the liquid tank 1. Subsequent to this introduction to the liquid, the posture of the automobile body W will then be changed to the horizontal posture, to allow the automobile body W to be advanced through the treatment liquid L in the liquid tank 1. Thereafter, the automobile body W will be changed in its posture to the rear-lowered liquid exit posture and also lifted up away from the treatment liquid L in the liquid tank 1. After this exit from the liquid, the posture of the automobile body W will be returned to the horizontal carrying posture to be sent to a subsequent treating stage. This is one non-limiting example of carrying treatment process possible with the above-described construction.

The traveling area for the carrier cart 3 and a disposing area of the liquid tank 1 are partitioned from each other by means of a partitioning wall 45 for preventing undesired intrusion of splashed liquid from the liquid tank 1 into the traveling area. This partitioning wall 45 defines a slit-like opening 46 extending horizontally along the traveling path of the carrier cart 3. Into this slit-like opening 46, the first and second support shafts 18, 23 are penetrated as penetrating members. And, as the lift arm 14, the drive arm 15 and the suspension mechanism 17 are located on the side of the liquid tank disposing area, the carrier cart 3 is caused to travel, with the slit-like opening 46 acting as the moving passage for the first and second support shafts 18, 23.

Figure 8:
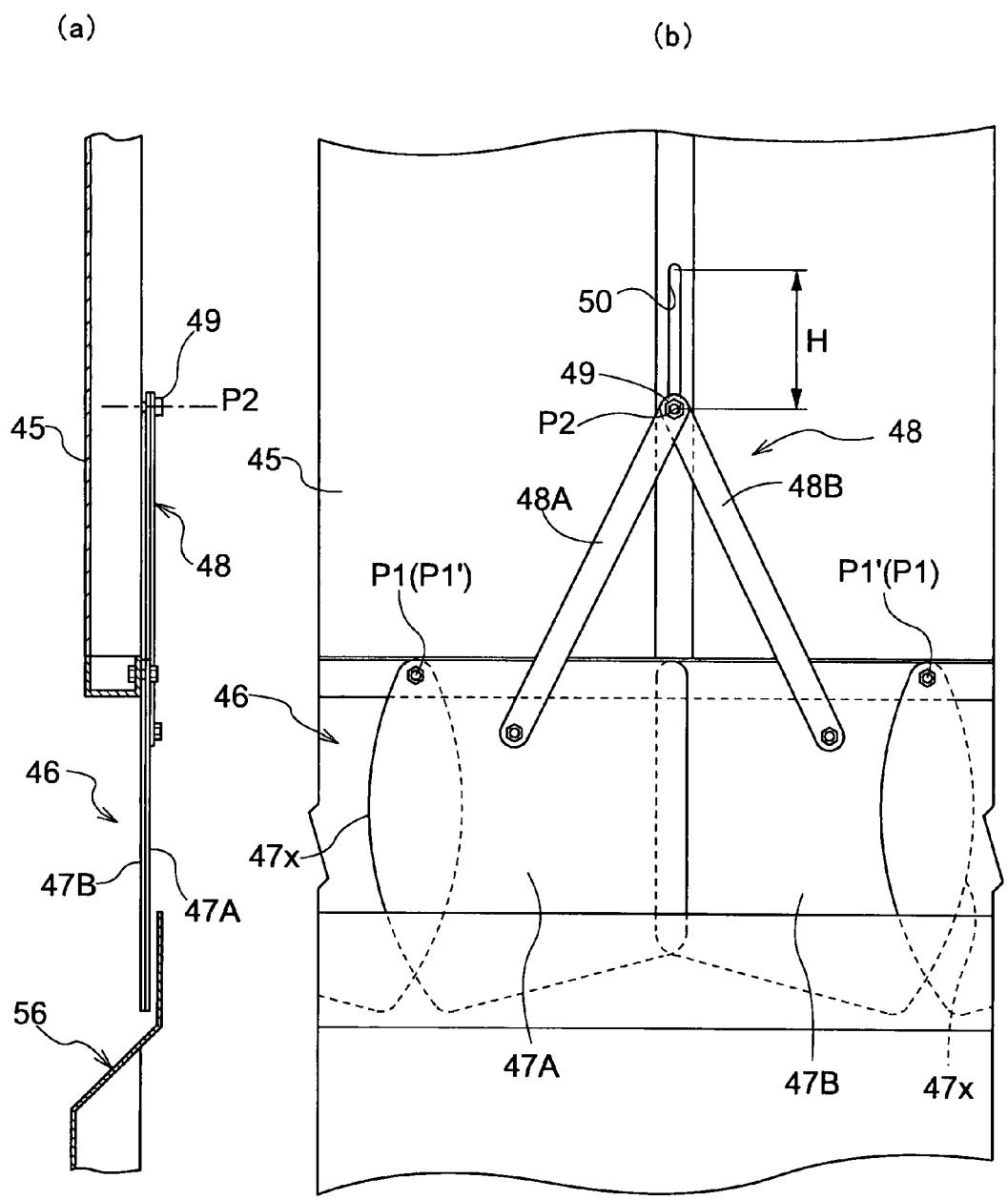

Further, on the wall face of this partitioning wall 45 on the side of the carrier cart traveling area, as shown in FIG. 3 and FIG. 8, there are provided a plurality of shielding plates 47A, 47B for closing the slit-like opening 46 except for its portions penetrated by the first and second support shafts 18, 23. The shielding plates 47A, 47B are juxtaposed along the slit-like opening 46 and suspended to be pivotally opened one after another by the first and second support shafts 18, 23 which are moving along the slit-like opening 46. Hence, these juxtaposed shielding plates 47A, 47B serve to prevent intrusion of splashed liquid from the liquid tank 1 into the traveling area of the carrier cart 3 via the slit-like opening 46.

Referring to the juxtaposition of the shielding plates 47A, 47B, the shielding plates 47A, 47B are provided as adjacent pairs each consisting of two plates adjacent each other. And, for each pair, as shown in FIGS. 11-14, there is provided an operative coupling mechanism 48 for operably coupling, with each other, the two paired shielding plates 47A, 47B in such a manner that as one shielding plate 47A (or 47B) is pushed open toward the downstream side in the support shaft moving direction by the first or second support shaft 18, 23, the other shielding plate 47B (or 47A) is pivotally opened in the opposite direction (i.e. toward the upstream side in the support shaft moving direction).

Referring to the shielding plates 47A, 47B in greater details, as shown in FIG. 8, for each pair, a pivot axis P1 of one shielding plate 47A and a pivot axis P1' of the other shielding plate 47B adjacent to the one shielding plate 47A are arranged side by side at a same position in an upper area of the overlapped portions of these shielding plates 47A, 47B. Referring to the operative coupling mechanism 48 in greater details, as viewed from the aperture plane of the slit-like opening 46 (that is, as viewed from the plate surface of the shielding plate 47), between the pivot axes P1, P1' of the two shielding plates 47A, 47B of each pair, there are disposed first and second links 48A, 48B, with the lower end of the first link 48A being pivotally connected to the one shielding plate 47A at a position close to the pivot axis P of the one shielding plate 47A and also with the lower end of the second link 48B being pivotally connected to the other shielding plate 47B at a position close to the pivot axis P' of the other shielding plate 47B. And, upper ends of these first and second links 48A, 48B are pivotally connected to each other via a connecting pin 49 at an upper end pivot connection point P2. Further, as a guiding means for guiding vertical displacement, for a predetermined range H, of this upper end pivot connection point P2, there is provided a vertically oriented guide slot 50 in which the connecting pin 49 at the upper end pivot connection point P2 is engaged.

That is, as shown in FIGS. 11 through 14, as the first support shaft 18 or the second support shaft 23 moving in association with the progress of traveling of the carrier cart 3 pushes open one shielding plate 47A (or 47B) of each pair located on the upstream side in the support shaft moving direction toward the downstream side in the support shaft moving direction by pivoting this plate about its pivot axis P1 (or P1'), the first link 48A (or second link 48B) whose lower end is pivotally connected to this one shielding plate 47A (or 47B) is pushed upward, so that the upper end pivot connection point P2 (in other words, the connecting pin 49) of the first and second links 48A, 48B is displaced upwards under the guidance of the guide slot 50. With this upward displacement of the upper end pivot connection point P2, the second link 48B (or first link 48A) is pushed up, so that in operative association with the one shielding plate 47A (or 47B), the other shielding plate 47B (or 47A) to which the lower end of this second link 48B (or first link 48A) is pivotally connected is pivotally opened about its pivot axis P' (or P1) toward the upstream side in the support shaft moving direction, which is the opposite direction to the movement of the one shielding plate 47A (or 47B).

As described above, the other shielding plate 47B (or 47A) is pivotally opened to the upstream side in the support shaft moving direction in operative association with the one shielding plate 47A (or 47B). Hence, in succession to the passage of the first support shaft 18 or second support shaft 23 trough the disposing position of one shielding plate 47A (or 47B) located on the upstream side in the support shaft moving direction, the shaft will enter the disposing position of the other shielding plate 47B (or 47A) which has already assumed the oppositely pivotally opened state and maintains the plate under this state through contact therewith. Therefore, even after the first support shaft 18 or the second support shaft 23 has completely left one shielding plate 47A (or 47B), as long as the first support shaft 18 or the second support shaft 23 retains the other shielding plate 47B (or 47A) under its oppositely pivotally opened state, the pivotally opened state of the one shielding plate 47A (or 47B) is maintained just like a case when the first support shaft 18 or the second support shaft 23 moving in reverse pushes open the other shielding plate 47B (or 47A) first and the one shielding member 47A (or 47B) is pivotally opened in the opposite direction in association therewith.

With continued movement of the first support shaft 18 or the second support shaft 23 from the above-described condition, the other shielding plate 47B (or 47A) located on the downstream side in the support shaft moving direction will be allowed to descend in the controlled progressive manner to its closing suspended state, while being kept in contact with the first support shaft 18 or the second support shaft 23. Then, after the other shielding plate 47B (or 47A) has reached the closing suspended state as the upper end pivot connection point P2 (connecting pin 49) of the first and second links 48A, 48B has been lowered to the lower end of the guide slot 50, the first support shaft 18 or the second support shaft 23 will then move away from this other shielding plate 47B (or 47A). In the course of this descending process, in its operative coupling with the other shielding plate 47B (or 47A) provided by the first and second links 48A, 48B, the one shielding plate 47A (or 47B) located on the upstream side in the support shaft moving direction too will be caused to descend in a controlled and progressive manner from its pivotally opened state to reach its closing suspended state eventually.

That is to say, with the above-described operative coupling between the two shielding plates 47A, 47B in each pair, both the one shielding plate 47A (or 47B) located on the upstream side in the support shaft moving direction and the other shielding plate 47B (or 47A) located on the downstream side of the same can be allowed to descend with its weight in the controlled progressive manner to the respective closing suspended states, in association with the movement of the first support shaft 18 or the second support shaft 23. As a result, it has become possible to effectively prevent generation of large noise such as friction noise or collision noise which would occur otherwise due to the uncontrolled free fall of each shielding plate 47A, 47B.

Moreover, with use of the above-described operative coupling construction, the above-described advantageous function can be obtained also in a case when the first support shaft 18 or the second support shaft 23 moving in reverse pushes open first the other shielding plate 47B (or 47A, i.e. the shielding plate located on the upstream side in this reverse moving direction) and then the first support shaft 18 or the second support shaft 23 passes through the disposing position of the one shielding plate 47A (or 47B, i.e. the shielding plate located on the downstream side in this reverse moving direction). Hence, the inventive construction can cope with both of the movement of the first support shaft 18 or the second support shaft 23 in the forward direction and that in the reverse direction.

FIGS. 11 through 14 illustrate how the juxtaposed shielding plates 47A, 47B are opened/closed one after another in the course of the carrying treating process of the automobile body W including its lifting up/down movements thereof. FIGS. 11(a) through (d) illustrate opening/closing operations in case the carrier cart 3 is caused to travel, with maintaining a spacing E between the first support shaft 18 and the second support shaft 23 at its maximum Emax. FIGS. 12(a) through (d) illustrate opening/closing operations in case the spacing E between the first support shaft 18 and the second support shaft 23 is reduced while the carrier cart 3 is kept still (that is, when the automobile body W is lowered at a predetermined carrying position). FIGS. 13(a) through (d) illustrate opening/closing operations in case the spacing E between the first support shaft 18 and the second support shaft 23 is maintained at its minimum Emin when the carrier cart 3 is caused to travel. FIGS. 14(a) through (d) illustrate opening/closing operations in case the spacing E between the first support shaft 18 and the second support shaft 23 is increased while the carrier cart 3 is kept still (i.e. in case the automobile body W is lifted up at a predetermined carrying position). From the illustrations of these figures, it may be understood that the shielding plates 47A, 47B of each pair can be opened/closed in succession in an effective and efficient manner in association with the movements of the first and second support shafts 18, 23, even when these first and second support shafts 18, 23 are moved in association with traveling of the carrier cart 3 with variation in the spacing E therebetween for the lifting up/down operations of the automobile body W (i.e. the approaching distance of the second support shaft 23 relative to the first support shaft 18).

Figure 10:
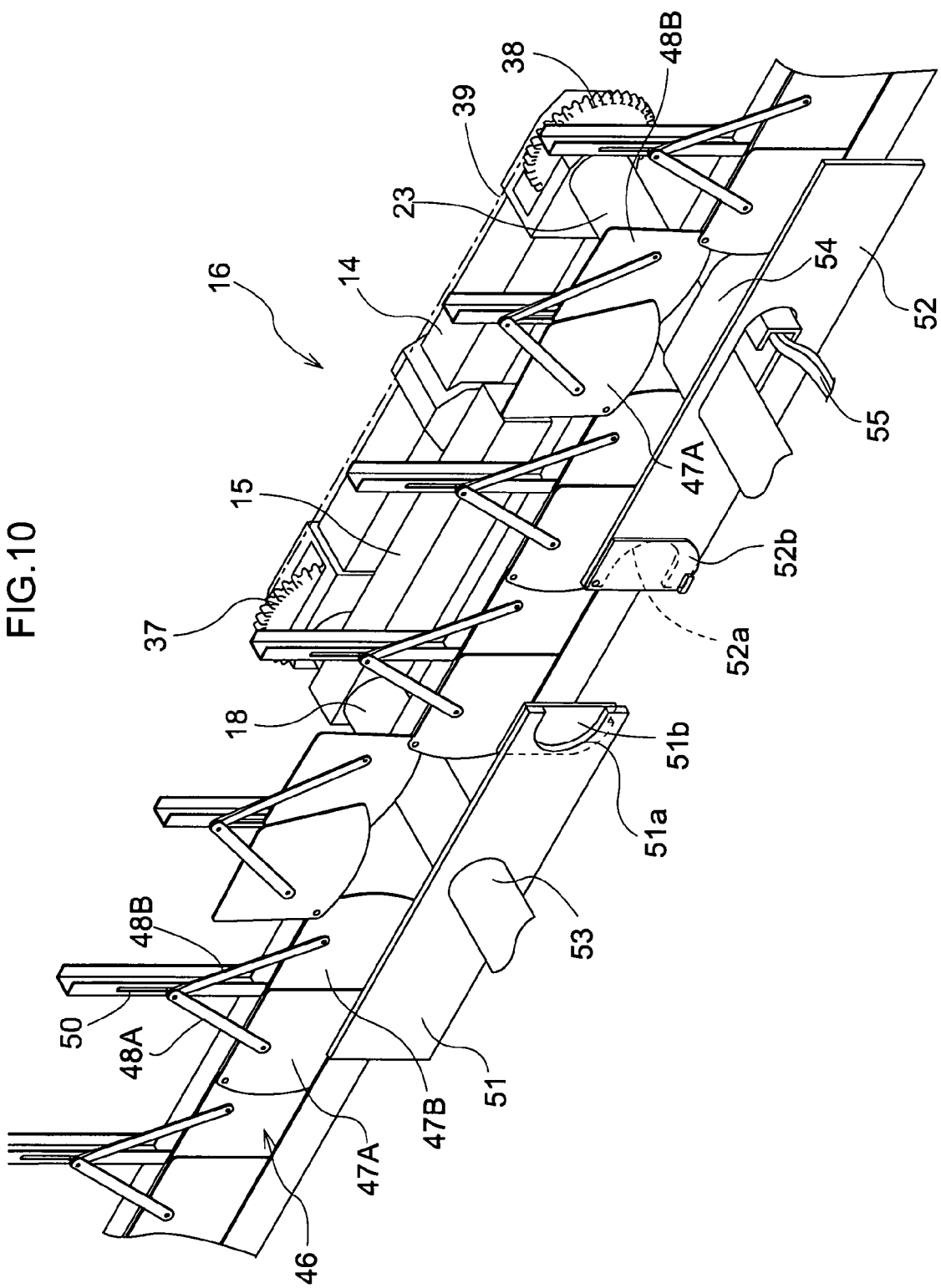
FIG. 10 is a perspective view showing shielding plates and movable shielding plates.
Figure 11:
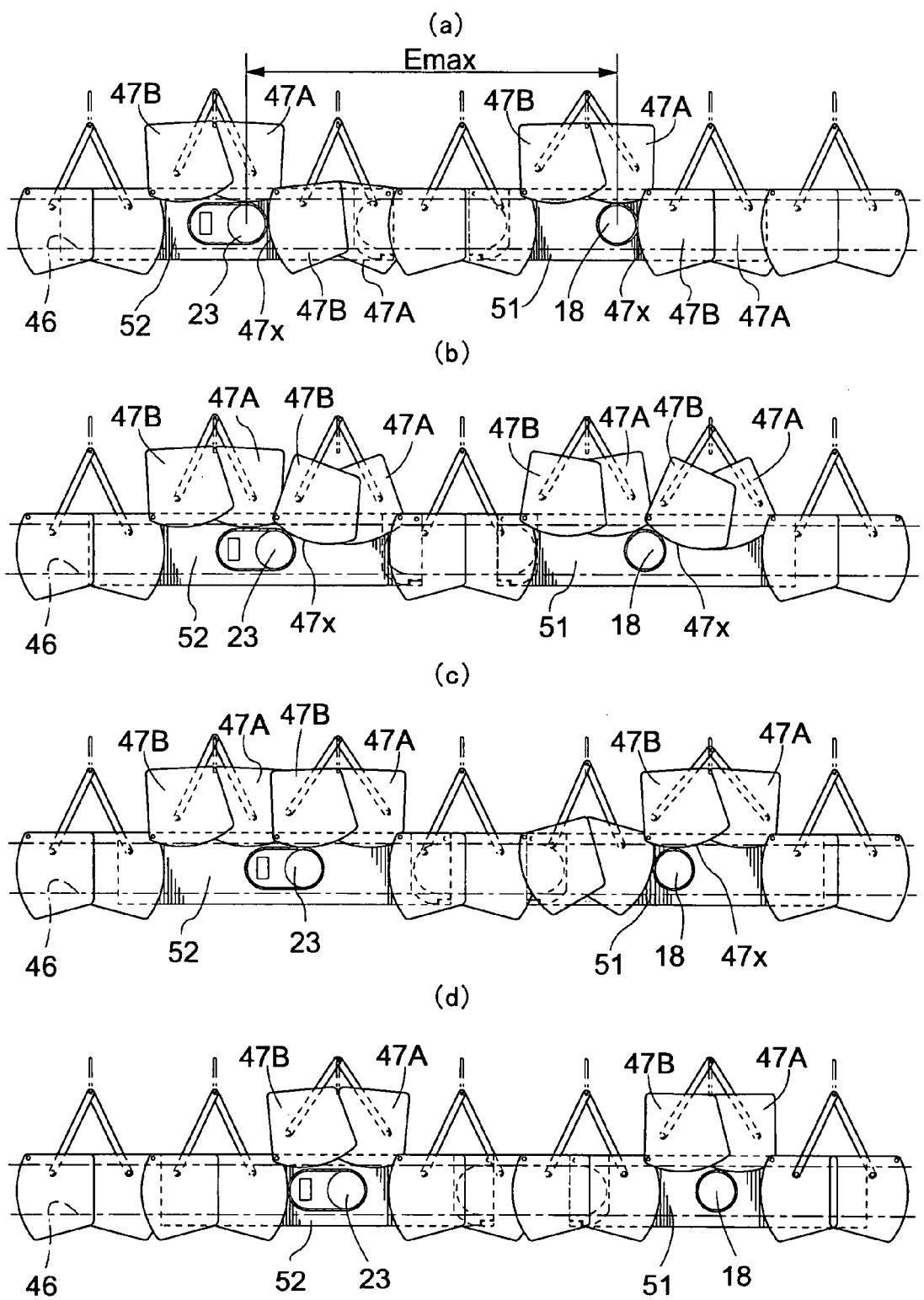
FIG. 11 is a plate face view illustrating moving relationship among first and second support shafts and the shielding plates.
Figure 12:
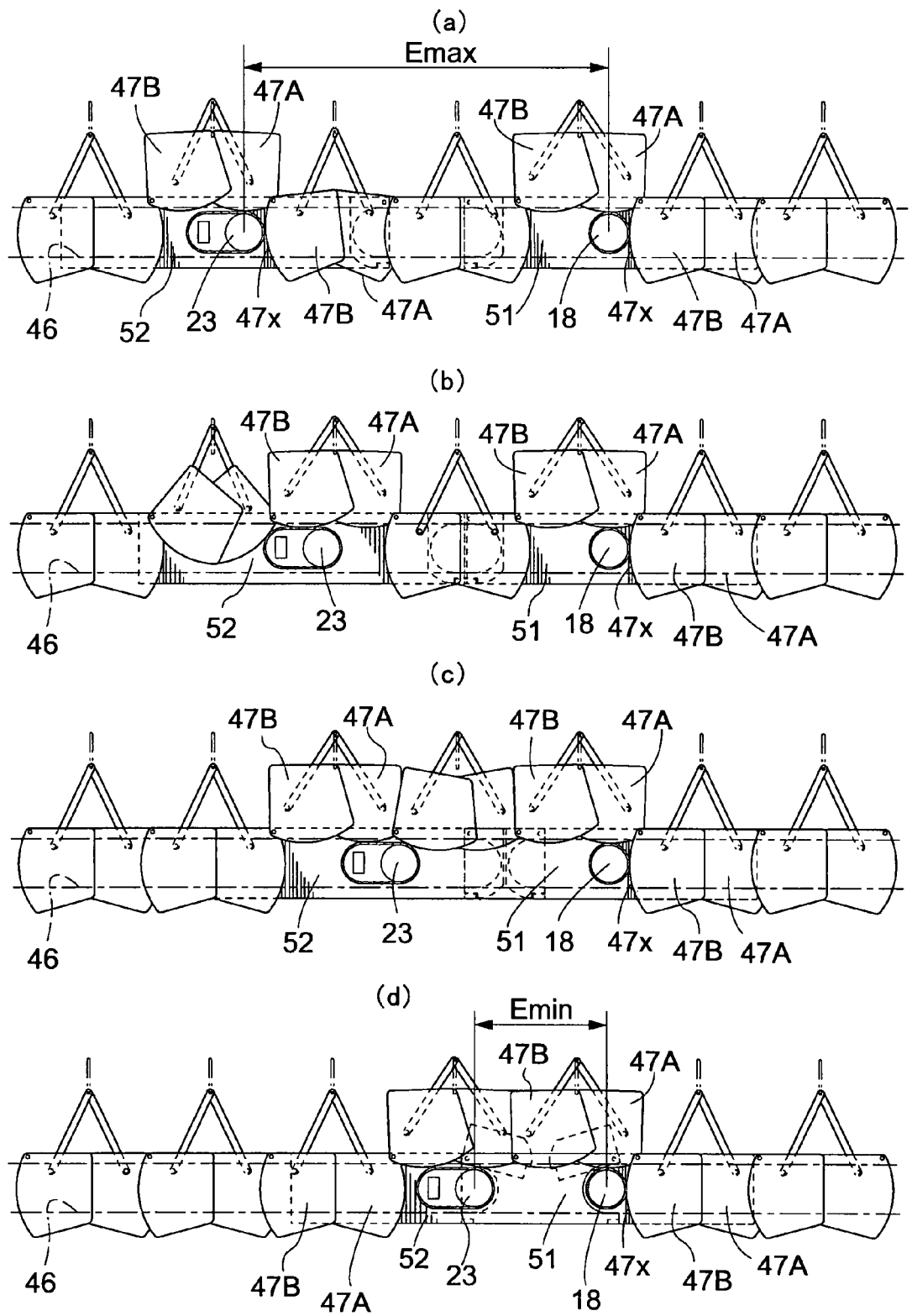
FIG. 12 is a plate face view illustrating moving relationship among first and second support shafts and the shielding plates.
Figure 13:
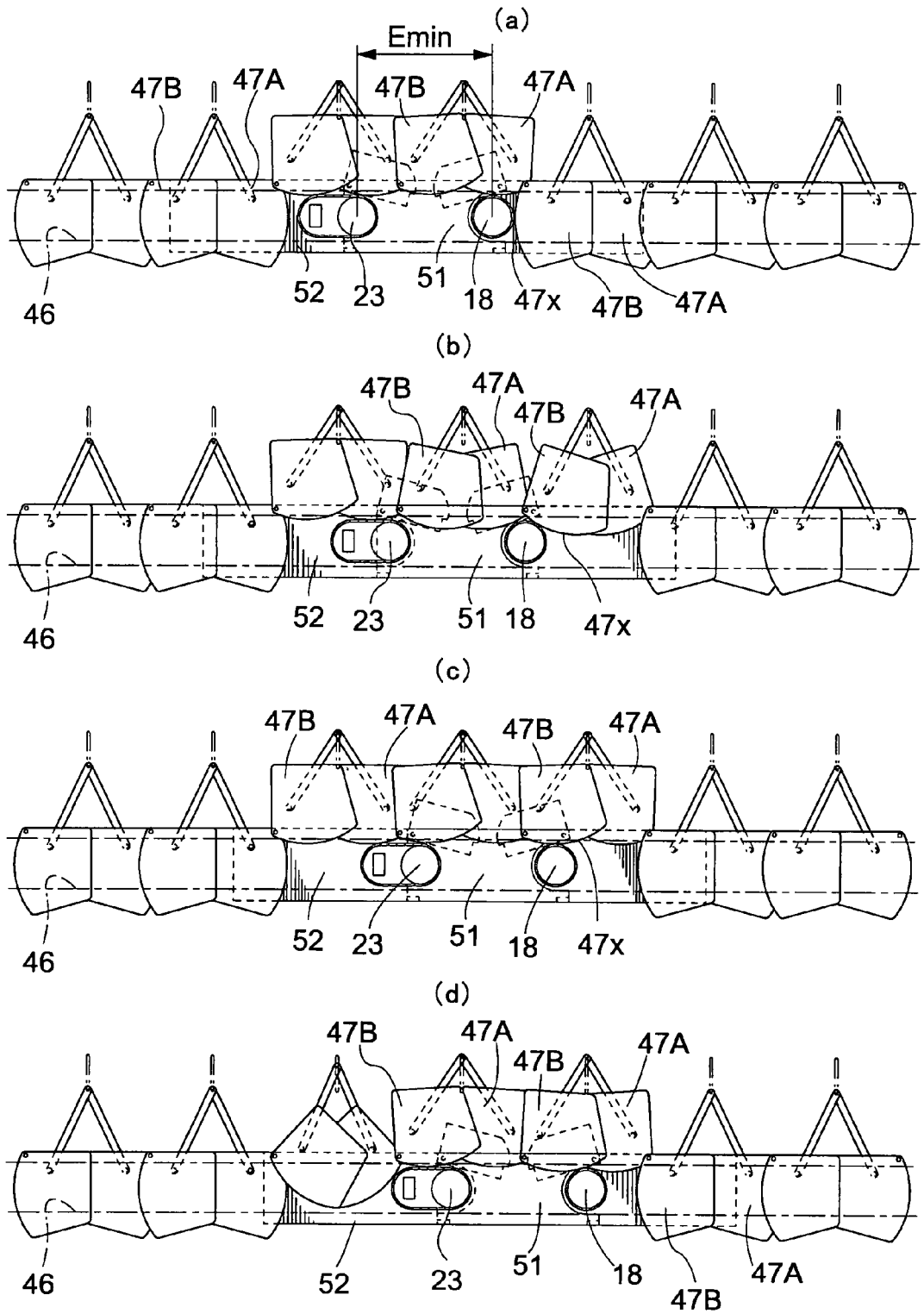
FIG. 13 is a plate face view illustrating moving relationship among first and second support shafts and the shielding plates.
Figure 14:
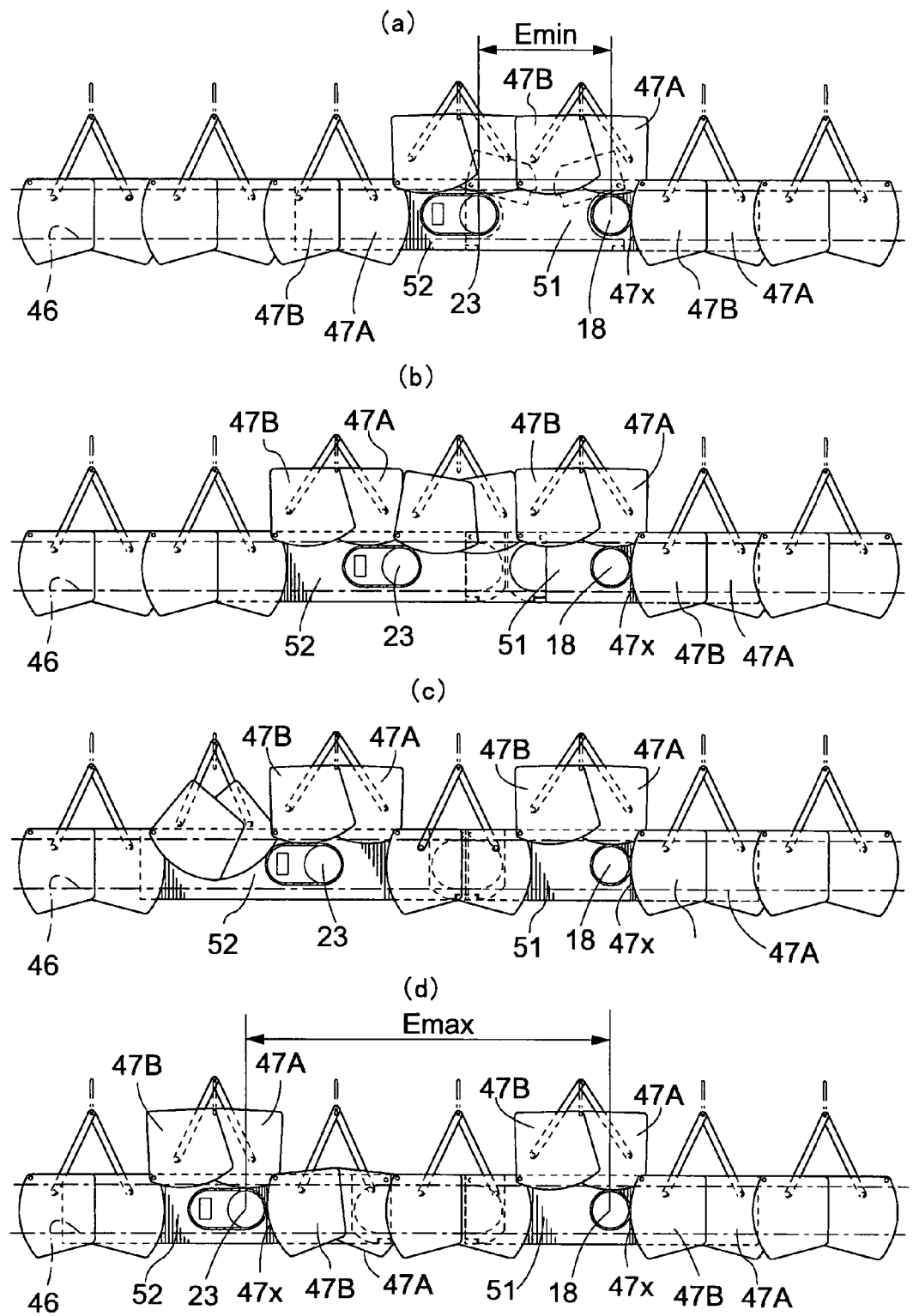
FIG. 14 is a plate face view illustrating moving relationship among first and second support shafts and the shielding plates, FIG. 15 are a section view and a view showing shielding plates both taken along the faces of the plates, relating to a second embodiment of the invention.

To the first support shaft 18 as the first penetrating member for the slit-like opening 46 and the second support shaft 23 as the second penetrating member for the same, there are respectively attached, as shown in FIG. 10, movable shielding plates 51, 52 having predetermined lengths D1, D2 in the fore and aft direction for closing the portions of the slit-like opening 46 where the shielding plates 47A, 47B are opened by the respective support shafts 18, 23. With this, it becomes possible to prevent, in an even more reliable manner, the intrusion of splashed liquid from the liquid tank 1 through the slit-like opening 46 into the traveling area of the carrier cart 3.

Figure 9:
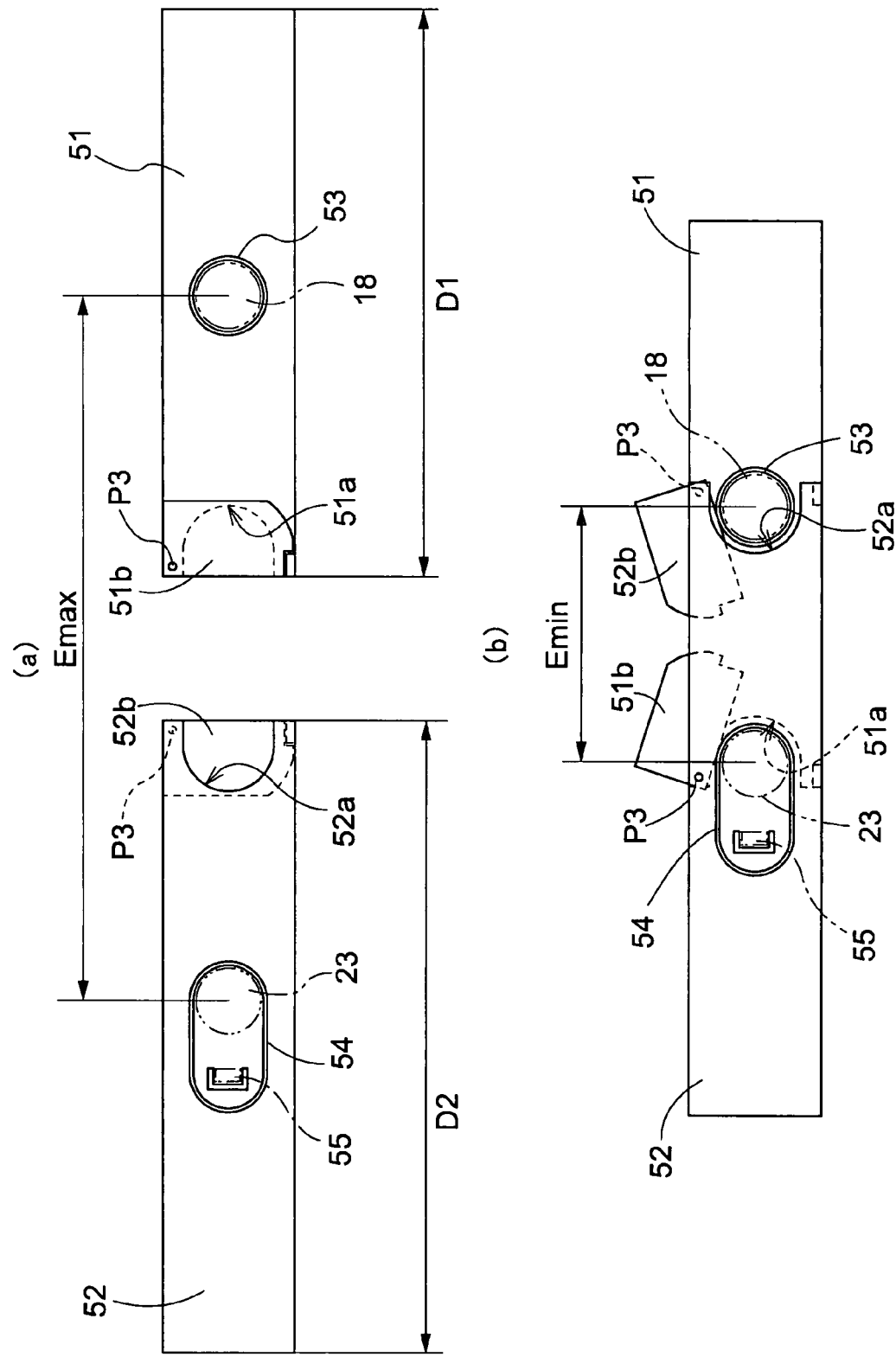
FIG. 9 is a view showing a movable shielding plate taken along the face of the plate.

Further, the movable shielding plates 51, 52 are attached respectively to the first and second support shafts 18, 23 such that in correspondence with the variation in the spacing E between the first support shaft 18 and the second support shaft 23 in association with the lifting up/down of the automobile body W, in the event of reduction in the spacing E, a half portion of the movable shielding plate 51 attached to the first support shaft 18 on the side of the second support shaft 23 and a half portion of the movable shielding plate 52 attached to the second support shaft 23 on the side of the first support shaft 18 will be overlapped with each other as viewed from the aperture plane of the slit-like opening 46 as illustrated in FIG. 9(b). And, one end of the movable shielding plate 51 attached to the first support shaft 18 on the side of the second support shaft 23 and one end of the movable shielding plate 52 attached to the second support shaft 23 on the side of the first support shaft 18, each defines a cutaway portion 51a, 52a for receiving therein the counterpart support shaft 18, 23 approaching it in the event of the reduction in the spacing E between the first support shaft 18 and the second support shaft 23. Further, an auxiliary shielding plate 51b, 52b for closing this cutaway portion 51a, 52a is suspended to be pivotally opened about its pivot axis P3 by the approaching counterpart support shaft 18, 23 as illustrated in FIGS. 9(a) and (b).

That is to say, with the formation of the cutaway portion 51a, 52a in the respective movable shielding plate 51, 52, it becomes possible to minimize the variable spacing E to be provided between the first support shaft 18 and the second support shaft 23, while ensuring increased length dimension D1, D2 of the movable shielding plate 51, 52 to be attached to each one of the first and second support shafts 18, 23 along their moving direction. Further, with the provision of the above-described auxiliary shielding plate 51b, 52b for closing the cutaway portion 51a, 52a, when the spacing E between the first support shaft 18 and the second support shaft 23 is large so that there is no intrusion of the counterpart support shaft 18, 23 into the cutaway portion 51a, 52a, the cutaway portions 51a, 52a are effectively closed by the auxiliary shielding plates 51b, 52b under the closing suspended states thereof. As a result, the movable shielding plate 51, 52 of each one of the first and second support shafts 18, 23 can provide sufficient shielding effect to the slit-like opening 46 along its entire length in the moving direction.

The shielding plates 47A, 47B juxtaposed along the slit-like opening 46, the movable shielding plates 51, 52 attached to the respective support shafts 18, 23 and the auxiliary shielding plates 51b, 52b attached to the respective movable shielding plates 51, 52 are formed of synthetic resin such as vinyl chloride. Whereas, the contacting portions of the first and second support shafts 18, 23 relative to the shielding plates 47A, 47b and the auxiliary shielding plates 51b, 52b are covered within protective tubes 53, 54 formed also of synthetic resin such as vinyl chloride.

Further, the protecting tube 54 for the second support shaft 23 is a tube having an oval cross section. And, as cables 55 are passed through this protective tube 54 together with the second support shaft 23, there is realized the protection of the cables 55 also.

Moreover, contacting portions 47x of the shielding plates 47A, 47B juxtaposed along the slit-like opening 46 relative to the first and second support shafts 18, 23 are curved convex, so as to provide smooth contact with the first and second support shafts 18, 23. Further, a the lower edge of the slit-like opening 46, there is provided a dripping guide plate 56 for receiving liquid dripped from the juxtaposed shielding plates 47A, 47B and allowing the liquid to flow down toward the disposing area of the liquid tank.

Second Embodiment

In the case of the first embodiment described above, as an example of the operative coupling mechanism 48 for operably coupling each two paired adjacent shielding plates 47A, 47B in such a manner that as one shielding plate 47A (or 47B) is pushed open toward the downstream side in the support shaft moving direction by the first or second support shaft 18, 23, the other shielding plate 47B (or 47A) is pivotally opened in the opposite direction (i.e. toward the upstream side in the support shaft moving direction), there was described the operative coupling mechanism 48 wherein as viewed from the aperture plane of the slit-like opening 46, between the pivot axes P1, P1' of the two shielding plates 47A, 47B of each pair, there are disposed the first and second links 48A, 48B, with the lower end of the first link 48A being pivotally connected to the one shielding plate 47A and also with the lower end of the second link 48B being pivotally connected to the other shielding plate 47B; upper ends of these first and second links 47A, 47B are pivotally connected to each other; and there is provided the guiding means 50 (guide slot) for guiding the vertical displacement of the upper end pivot connection point P2 over the predetermined range H. Instead of this, the construction may employ a modified operative coupling mechanism 48' shown in FIG. 15.

Figure 15:
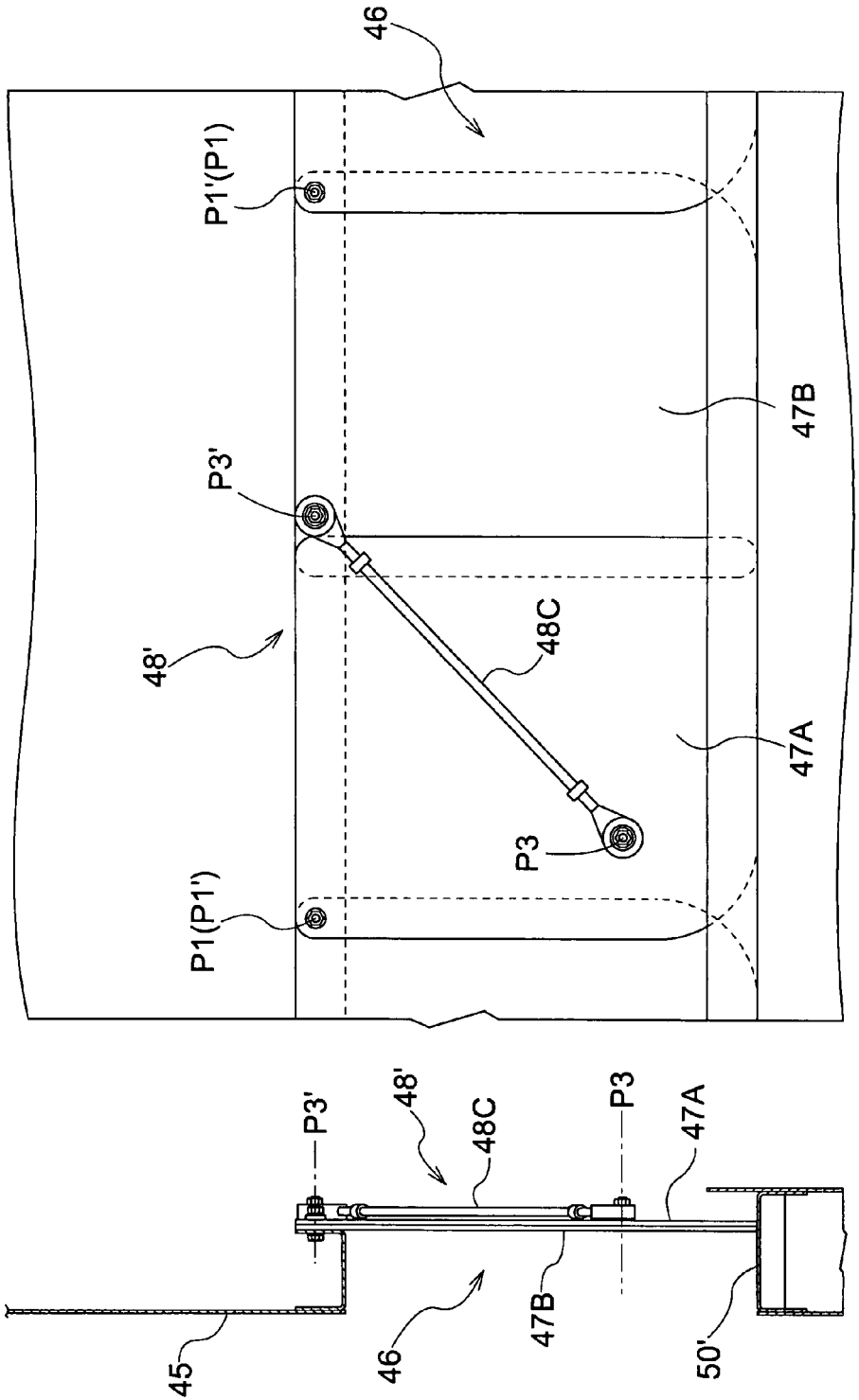
Figure 18:
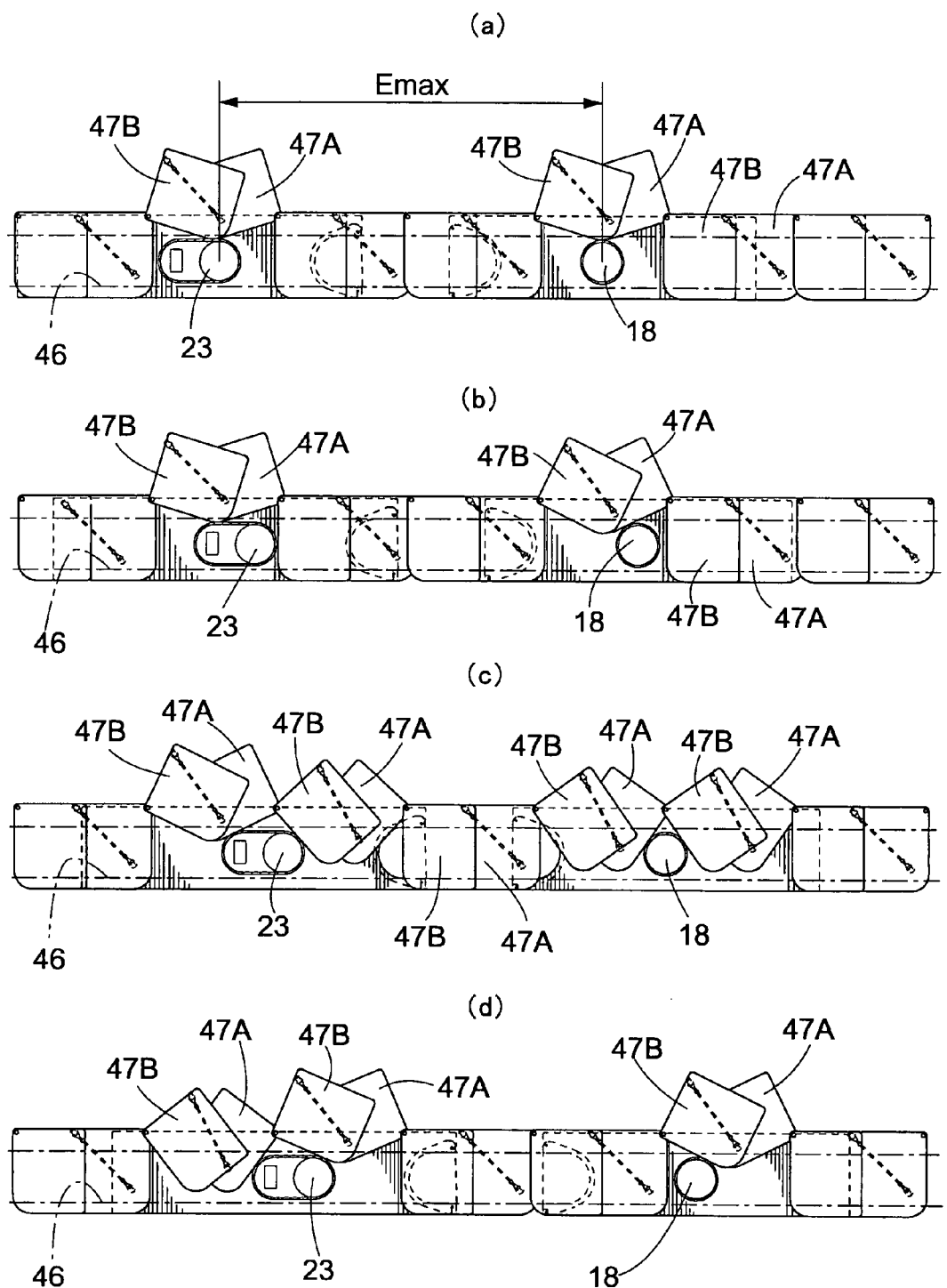
FIG. 18 is a plate face view illustrating moving relationship among first and second support shafts and the shielding plates, relating to the second embodiment.
Figure 20:
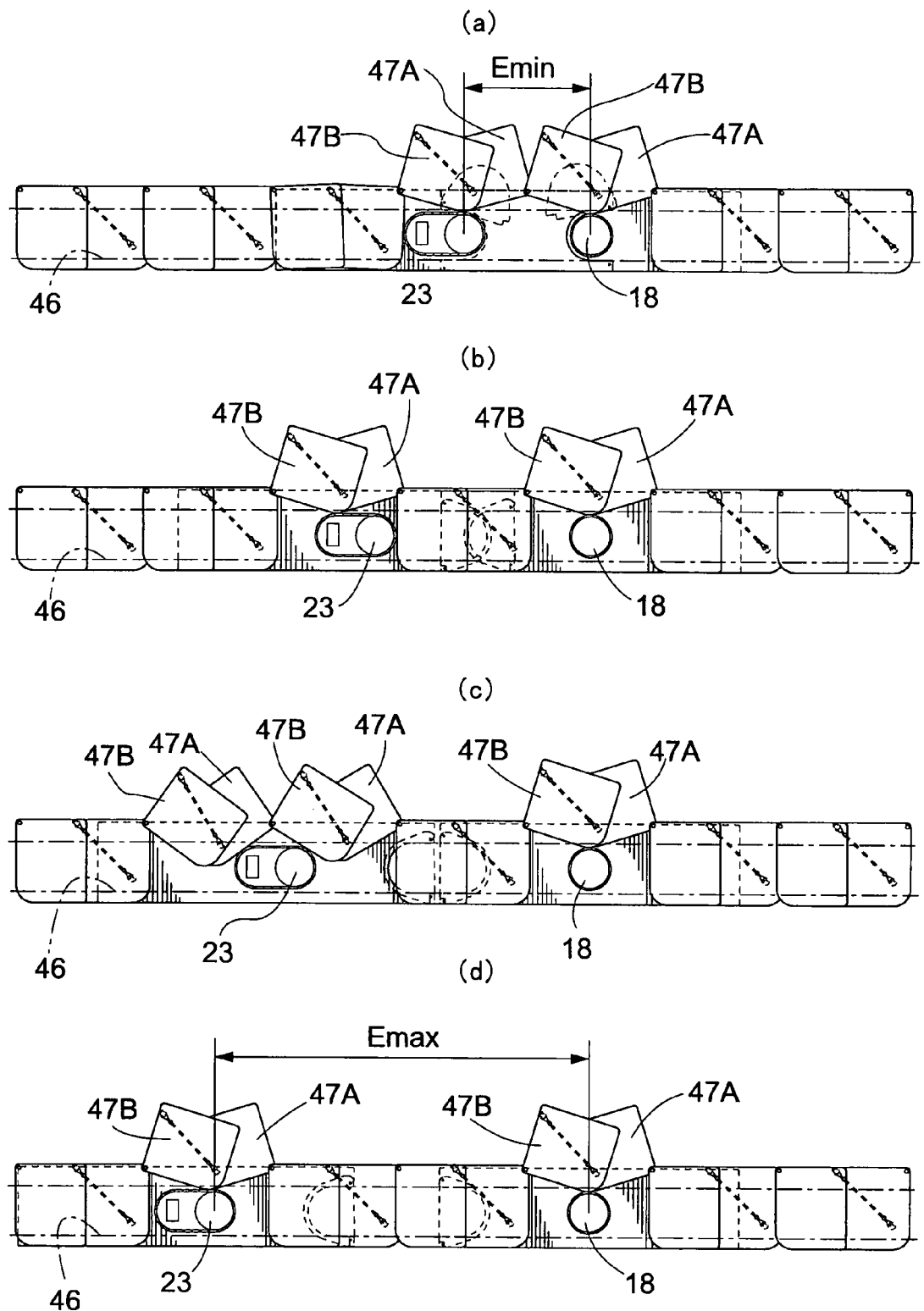
FIG. 20 is a plate face view illustrating moving relationship among first and second support shafts and the shielding plates, relating to the second embodiment.

This operative coupling mechanism 48' shown in FIG. 15 includes a coupling link 48C having one end thereof pivotally connected to one shielding plate 47A and having the other end thereof pivotally connected to the other shielding plate 47B, as viewed from the aperture plane of the slit-like opening 46, with a pivot connection point P3' of the coupling link 48C to the other shielding plate 47B being disposed above a virtual straight line (not shown) interconnecting a pivot connection point P3 of the coupling link 48C to the one shielding plate 47A and the pivot axis P1' of the other shielding plate 47B, as viewed from an aperture plane of said slit-like opening 46, the pivot connection point P3 of the coupling link 48C to the one shielding plate 47A to the other shielding plate 47B being disposed below a virtual line interconnecting the pivot connection point P3' of the coupling link 48C to the other shielding plate 47B and the pivot axis P1 of the one shielding plate 47A, as viewed from the aperture plane of the slit-like opening 46, and a stopper means for limiting the gravity descension of each one of the paired shielding plates 47A, 47B to a predetermined closing suspended position.

More particularly, the respective shielding plates 47A, 47B are juxtaposed with each other such that the pivot axis P1 of one shielding plate 47A and the pivot axis P1' of the other shielding plate 47B are arranged at same positions in upper areas of the overlapping portions of these shielding plates 47A, 47B, whereas, for the respective pair of two adjacent shielding plates 47A, 47B, one end of the coupling link 48C is pivotally connected to a lower portion of one shielding plate 47A and at a position offset toward the pivot axis P1 of this one shielding plate 47A and the other end of the coupling link 48C is pivotally connected to an upper portion of the other shielding plate 47B at a position offset to the opposite side to the pivot axis P1' of this other shielding plate 47B. And, at the lower edge of the slit-like opening 46, there is provided a perimeter edge member 50' as the above-described stopper means. In operation, as the lower edge of each shielding plate 47A, 47B comes into abutment against the perimeter edge member 50', the gravity descending of each shielding plate 47A, 47B is limited to the predetermined closing suspended position.

That is to say, with the operative coupling mechanism 48' shown in FIG. 15 also, as illustrated in FIGS. 16 through 20, the first support shaft 18 or the second support shaft 23 moving in association with traveling of the carrier cart 3 pushes open, toward the downstream side in the support shaft moving direction, one shielding plate 47A (or 47B) located on the upstream side in the support shaft moving direction by pivoting this plate 47A about its pivot axis P1 (or P1'). In this, due to the operative coupling between the two shielding plates 47A, 47B provided by the operative link 48C, in association with the movement of the one shielding plate 47A (or 47B), the other shielding plate 47B (or 47A), in operative association with the one shielding plate 47A (or 47B), is pivotally opened about its pivot axis P1' (or P1) toward the upstream side in the support shaft moving direction opposite to the moving direction of the one shielding plate 47A (or 47B). Hence, in succession to passage of the first support shaft 18 or the second support shaft 23 through the disposing position of the one shielding plate 47A (or 47B) located on the upstream side in the support shaft moving direction, the support shaft proceeds to enter the disposing position of the other shielding plate 47B (or 47A) which has already assumed the oppositely pivotally opened state, and comes into contact with the other shielding plate 47B (or 47A) so as to retain this shielding plate under the oppositely (the upstream side in the support shaft moving direction) pivotally opened state. Therefore, even after the first support shaft 18 or the second support shaft 23 has completely left one shielding plate 47A (or 47B), as long as the first support shaft 18 or the second support shaft 23 retains the other shielding plate 47B (or 47A) under its oppositely pivotally opened state, the pivotally opened state of the one shielding plate 47A (or 47B) is maintained just like a case when the first support shaft 18 or the second support shaft 23 moving in reverse pushes open the other shielding plate 47B (or 47A) and the one shielding member 47A (or 47B) is pivotally opened in the opposite direction in association therewith.

With continued movement of the first support shaft 18 or the second support shaft 23 from the above-described condition, the other shielding plate 47B (or 47A) located on the downstream side in the support shaft moving direction will be allowed to descend in the controlled progressive manner to its closing suspended state, while being kept in contact with the first support shaft 18 or the second support shaft 23. Then, after the other shielding plate 47B (or 47A) has reached the closing suspended state as the lower edge of the other shielding plate 47B (or 47A) comes into abutment against the perimeter edge member 50' as the above-described stopper means, the first support shaft 18 or the second support shaft 23 will then move away from this other shielding plate 47B (or 47A). In the course of this descending process, in its operative coupling with the other shielding plate 47B (or 47A), the one shielding plate 47A (or 47B) too will be caused to descend in a controlled and progressive manner from its pivotally opened state to reach its closing suspended state eventually.

Incidentally, FIGS. 16(a) through (d) illustrate opening/closing operations in case the spacing E between the first support shaft 18 and the second support shaft 23 is maintained at its minimum Emin when the carrier cart 3 is caused to travel. FIGS. 17(a) through (d) illustrate opening/closing operations in case the spacing E between the first support shaft 18 and the second support shaft 23 is maintained at its intermediate value Emid when the carrier cart 3 is caused to travel. FIGS. 18(a) through (d) illustrate opening/closing operations in case the spacing E between the first support shaft 18 and the second support shaft 23 is maintained at its maximum Emax when the carrier cart 3 is caused to travel.

Further, FIGS. 19(a) through (d) illustrate opening/closing operations in case the spacing E between the first support shaft 18 and the second support shaft 23 is reduced (that is, when the automobile body W is lowered at a predetermined carrying position) while the carrier cart 3 is kept still. FIGS. 20(a) through (d) illustrate opening/closing operations in case the spacing E between the first support shaft 18 and the second support shaft 23 is increased while the carrier cart 3 is kept still (i.e. in case the automobile body W is lifted up at a predetermined carrying position).

Other Embodiments

Next, some other embodiments of the invention will be described respectively.

In the foregoing embodiments, the first and second support shafts 18, 23 of the carrying treating apparatus for automobile bodies W are provided as the "penetrating members" relative to the slit-like opening 46. However, in embodying the present invention, the penetrating member to penetrated into the slit-like opening 46 to be moved along it is not limited to the above-described support shafts 18, 23 of the carrying treatment system, but can be other member(s) for any other purpose.

Further, the purpose of providing or mounting the partitioning wall 45 defining the slit-like opening 46 and the shielding plates 47A, 47B juxtaposed along the slit-like opening 46 is not limited to the receiving/stopping splashed liquid, but these members can be provided/mounted for any other purpose.

As the operative coupling mechanism 48, 48' for operatively coupling two adjacent shielding plates 47A, 47B of each pair such that in association with pushed opening of one shielding plate 47A by the penetrating member 18, 23, the other shielding plate 47B is pivotally opened in the opposite direction thereto, the first embodiment employed the mechanism including the first and second links 48A, 48B and the guiding means 50 for the upper end pivot connection point P2 of these links 48A, 48B and the second embodiment employed the modified mechanism including the operative link 48C and the stopper means 50'. These are just non-limiting examples of the operative coupling mechanism. This mechanism can utilize any other linking method or can have any other construction.

Further, as this operative coupling mechanism, in case the mechanism disclosed in the first embodiment, including the first and second links 48A, 48B and the guiding means 50 for the upper end pivot connection point P2 of these links 48A, 48B is employed, the guiding means for guiding the vertical displacement of the upper end pivot connection point P2 is not limited to the guide slot 50 described in the foregoing embodiment. The guiding means can be of a rail type construction for instance. Also, in case the mechanism disclosed in the second embodiment, including the operative link 48C and the stopper means 50' is employed, various modifications will be possible for the specific construction of the stopper means 50'.

The invention claimed is:

1. A through section shielding construction comprising:
a penetrating member;
a partitioning wall defining a slit opening extending along a lateral direction as a passage for movement of the penetrating member relative to the partitioning wall, and
a plurality of shielding plates for closing the slit opening, the plurality of shielding plates being juxtaposed along the slit opening and suspended pivotally to be pushed open one after another by the penetrating member moving along the slit opening;
wherein the shielding plates are provided as adjacent pairs, and there is provided an operative coupling mechanism for operatively coupling, with each other, two shielding plates constituting said each pair in such a manner that in association with one of the paired shielding plates being pushed open in one direction by the penetrating member, the other shielding plate is pivotally opened in the opposite direction to said one direction,
further comprising a movable shielding plate attached to said penetrating member, the movable shielding plate shielding a portion of the slit opening where the shielding plate is opened by the penetrating member.

2. The through section shielding construction according to claim 1, said penetrating member includes a first and second penetrating members having a spacing in the moving direction thereof variable, each one of the first penetrating member and the second penetrating member having at least one movable shielding plate attached thereto, such that the movable shielding plate attached to the first penetrating member and the movable shielding plate attached to the second penetrating member are partially overlapped with each other when the spacing between the first penetrating member and the second penetrating member is reduced;
one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and
an auxiliary shielding plate for closing said cutaway portion is suspended to be pivotally pushed open by the counterpart approaching penetrating member.

3. A through section shielding construction comprising:
a penetrating member;
a partitioning wall defining a slit opening extending along a lateral direction as a passage for movement of the penetrating member relative to the partitioning wall, and
a plurality of shielding plates for closing the slit opening, the plurality of shielding plates being juxtaposed along the slit opening and suspended pivotally to be pushed open one after another by the penetrating member moving along the slit opening;

wherein the shielding plates are provided as adjacent pairs, and there is provided an operative coupling mechanism for operatively coupling, with each other, two shielding plates constituting said each pair in such a manner that in association with one of the paired shielding plates being pushed open in one direction by the penetrating member, the other shielding plate is pivotally opened in the opposite direction to said one direction, wherein said operative coupling mechanism includes first and second links disposed between pivot axes of the paired shielding plates as viewed toward a plane of said slit opening, with a lower end of the first link being pivotally connected to one shielding plate, a lower end of the second link being pivotally connected to the other shielding plate, upper ends of the first and second links being pivotally connected to each other at an upper end pivot connection point and a guiding means for guiding vertical displacement of said upper end pivot connection point over a predetermined range.

4. The through section shielding construction according to claim 3, further comprising a movable shielding plate attached to said penetrating member, the movable shielding plate shielding a portion of the slit opening where the shielding plate is opened by the penetrating member.

5. The through section shielding construction according to claim 4, said penetrating member includes first and second penetrating members having a spacing in the moving direction thereof variable, each one of the first penetrating member and the second penetrating member having at least one movable shielding plate attached thereto, such that the movable shielding plate attached to the first penetrating member and the movable shielding plate attached to the second penetrating member are partially overlapped with each other when the spacing between the first penetrating member and the second penetrating member is reduced;

one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and an auxiliary shielding plate for closing said cutaway portion is suspended to be pivotally pushed open by the counterpart approaching penetrating member.

6. A through section shielding construction comprising:
a penetrating member;
a partitioning wall defining a slit opening extending along a lateral direction as a passage for movement of the penetrating member relative to the partitioning wall, and
a plurality of shielding plates for closing the slit opening, the plurality of shielding plates being juxtaposed along the slit opening and suspended pivotally to be pushed open one after another by the penetrating member moving along the slit opening;

wherein the shielding plates are provided as adjacent pairs, and there is provided an operative coupling mechanism for operatively coupling, with each other, two shielding plates constituting said each pair in such a manner that in association with one of the paired shielding plates being pushed open in one direction by the penetrating member, the other shielding plate is pivotally opened in the opposite direction to said one direction, wherein the operative coupling mechanism includes at least one pivotable link, and, wherein said at least one pivotable link includes first and second links disposed between pivot axes of the paired shielding plates as viewed toward a plane of said slit opening, with a lower end of the first link being pivotally connected to one shielding plate, a lower end of the second link being pivotally connected to the other shielding plate, upper ends of the first and second links being pivotally connected to each other at an upper end pivot connection point and a guiding means for guiding vertical displacement of said upper end pivot connection point over a predetermined range.

7. The through section shielding construction according to claim 6, a movable shielding plate attached to said penetrating member, the movable shielding plate shielding a portion of the slit opening where the shielding plate is opened by the penetrating member.

8. The through section shielding construction according to claim 7, said penetrating member includes first and second penetrating members having a spacing in the moving direction thereof variable, each one of the first penetrating member and the second penetrating member having at least one movable shielding plate attached thereto, such that the movable shielding plate attached to the first penetrating member and the movable shielding plate attached to the second penetrating member are partially overlapped with each other when the spacing between the first penetrating member and the second penetrating member is reduced;

one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and an auxiliary shielding plate for closing said cutaway portion is suspended to be pivotally pushed open by the counterpart approaching penetrating member.

9. A through section shielding construction comprising:
a penetrating member;
a partitioning wall defining a slit opening extending along a lateral direction as a passage for movement of the penetrating member relative to the partitioning wall, and
a plurality of shielding plates for closing the slit opening, the plurality of shielding plates being juxtaposed along the slit opening and suspended pivotally to be pushed open one after another by the penetrating member moving along the slit opening;

wherein the shielding plates are provided as adjacent pairs, and there is provided an operative coupling mechanism for operatively coupling, with each other, two shielding plates constituting said each pair in such a manner that in association with one of the paired shielding plates being pushed open in one direction by the penetrating member, the other shielding plate is pivotally opened in the opposite direction to said one direction, wherein said operative coupling mechanism includes a coupling link having one end thereof pivotally connected to one shielding plate and having the other end thereof pivotally connected to the other shielding plate, with a pivot connection of said coupling link to the other shielding plate being disposed above a virtual straight line interconnecting a pivot connection of said coupling link to the one shielding plate and the pivot axis of the other shielding plate, as viewed toward a plane of said slit opening, the pivot connection of said coupling link to the one shielding plate being disposed below a virtual line interconnecting the pivot connection of the coupling link to the other shielding plate and the pivot axis of the one shielding plate, as viewed toward a plane of said slit opening, and a stopper means for limiting the gravity descension of each one of the paired shielding plates to a predetermined closing suspended position.

10. The through section shielding construction according to claim 9, further comprising a movable shielding plate attached to said penetrating member, the movable shielding plate shielding a portion of the slit opening where the shielding plate is opened by the penetrating member.

11. The through section shielding construction according to claim 10, said penetrating member includes first and second penetrating members having a spacing in the moving direction thereof variable, each one of the first penetrating member and the second penetrating member having at least one movable shielding plate attached thereto, such that the movable shielding plate attached to the first penetrating member and the movable shielding plate attached to the second penetrating member are partially overlapped with each other when the spacing between the first penetrating member and the second penetrating member is reduced;
  one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and
  an auxiliary shielding plate for closing said cutaway portion is suspended to be pivotally pushed open by the counterpart approaching penetrating member.

12. A through section shielding construction comprising:
  a penetrating member;
  a partitioning wall defining a slit opening extending along a lateral direction as a passage for movement of the penetrating member relative to the partitioning wall, and
  a plurality of shielding plates for closing the slit opening, the plurality of shielding plates being juxtaposed along the slit opening and suspended pivotally to be pushed open one after another by the penetrating member moving along the slit opening;
  wherein the shielding plates are provided as adjacent pairs, and there is provided an operative coupling mechanism for operatively coupling, with each other, two shielding plates constituting said each pair in such a manner that in association with one of the paired shielding plates being ushed open in one direction by penetrating plate member the other shielding plate is pivotally opened in the opposite direction to said one direction,
  wherein the operative coupling mechanism includes at least one pivotable link, and
  wherein said at least one pivotable link includes a coupling link having one end thereof pivotally connected to one shielding plate and having the other end thereof pivotally connected to the other shielding plate, with a pivot connection of said coupling link to the other shielding plate being disposed above a virtual straight line interconnecting a pivot connection of said coupling link to the one shielding plate and the pivot axis of the other shielding plate, as viewed toward a plane of said slit opening, the pivot connection of said coupling link to the one shielding plate being disposed below a virtual line interconnecting the pivot connection of the coupling link to the other shielding plate and the pivot axis of the one shielding plate, as viewed toward a plane of said slit opening, and a stopper means for limiting the gravity descension of each one of the paired shielding plates to a predetermined closing suspended position.

13. The through section shielding construction according to claim 12, further comprising a movable shielding plate attached to said penetrating member, the movable shielding plate shielding a portion of the slit opening where the shielding plate is opened by the penetrating member.

14. The through section shielding construction according to claim 13, said penetrating member includes first and second penetrating members having a spacing in the moving direction thereof variable, each one of the first penetrating member and the second penetrating member having at least one movable shielding plate attached thereto, such that the movable shielding plate attached to the first penetrating member and the movable shielding plate attached to the second penetrating member are partially overlapped with each other when the spacing between the first penetrating member and the second penetrating member is reduced;
  one end of said movable shielding plate attached to the first penetrating member on the side of the second penetrating member and one end of said movable shielding plate attached to the second penetrating member on the side of the first penetrating member, each defines a cutaway portion for receiving therein the counterpart penetrating member approaching it when the spacing between the first penetrating member and the second penetrating member is reduced; and
  an auxiliary shielding plate for closing said cutaway portion is suspended to be pivotally pushed open by the counterpart approaching penetrating member.

* * * * *

UNITED STATES PATENT AND TRADEMARK OFFICE
CERTIFICATE OF CORRECTION

PATENT NO.         : 7,818,921 B2
APPLICATION NO.    : 11/706874
DATED              : October 26, 2010
INVENTOR(S)        : Hisashi et al.

It is certified that error appears in the above-identified patent and that said Letters Patent is hereby corrected as shown below:

Face of the Patent, See Item (73) Assignee:, after "Daifuku Co., Ltd., Osaka (JP)",
add the second Assignee -- Taikisha Ltd., Tokyo (JP) --

Column 20, line 2, Claim 12, "being ushed" should read -- being pushed --

Signed and Sealed this
Third Day of May, 2011

David J. Kappos
*Director of the United States Patent and Trademark Office*